(12) United States Patent
Riffe et al.

(10) Patent No.: US 10,723,645 B2
(45) Date of Patent: Jul. 28, 2020

(54) CONCENTRATION OF WASTEWATER TO REDUCE FLOW RATE, COST, AND FOOTPRINT OF TREATMENT SYSTEM

(71) Applicant: Evoqua Water Technologies LLC, Pittsburgh, PA (US)

(72) Inventors: Michael R. Riffe, Gibsonia, PA (US); Frank L. Sassaman, Fombell, PA (US); Michael W. Wismer, Lino Lakes, MN (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 7 days.

(21) Appl. No.: 16/184,453

(22) Filed: Nov. 8, 2018

(65) Prior Publication Data

US 2019/0135672 A1    May 9, 2019

Related U.S. Application Data

(63) Continuation of application No. 15/347,427, filed on Nov. 9, 2016, now Pat. No. 10,125,040, which is a
(Continued)

(51) Int. Cl.
*C02F 9/00* (2006.01)
*C02F 1/70* (2006.01)
(Continued)

(52) U.S. Cl.
CPC .............. *C02F 9/00* (2013.01); *C02F 1/004* (2013.01); *C02F 1/38* (2013.01); *C02F 1/385* (2013.01); *C02F 1/441* (2013.01); *C02F 1/442* (2013.01); *C02F 1/52* (2013.01); *C02F 1/705* (2013.01); *C02F 3/1273* (2013.01); *C02F 3/30* (2013.01); *C02F 11/122* (2013.01); *C02F 2101/103* (2013.01); *C02F 2101/106* (2013.01); *C02F 2101/163* (2013.01); *C02F 2101/20* (2013.01); *C02F 2301/043* (2013.01); *Y02A 20/156* (2018.01); *Y02W 10/15* (2015.05)

(58) Field of Classification Search
CPC ...... B01D 2311/04; C02F 9/00; C02F 1/5236; C02F 1/444; C02F 1/001
USPC ................................................... 210/650, 651
See application file for complete search history.

(56) References Cited

U.S. PATENT DOCUMENTS

| | | | | |
|---|---|---|---|---|
| 4,405,464 A | * | 9/1983 | Baldwin | C02F 1/705 210/717 |
| 4,519,913 A | * | 5/1985 | Baldwin | C02F 3/2806 210/611 |

(Continued)

OTHER PUBLICATIONS

Australian Patent Examination Report No. 1, AU Application No. 2011305313, dated Dec. 16, 2013.
Written Opinion in PCT/US2011/052858, dated Feb. 7, 2012.

*Primary Examiner* — Claire A Norris

(57) ABSTRACT

A system to remove contaminants from contaminated water contains a pre-concentrating subsystem, a contaminant removal subsystem or a biological subsystem configured to remove two or more contaminants, and a permeate blending subsystem. A process for removing contaminants from contaminated water includes concentrating contaminated water, treating concentrated contaminated water, and combining product water to produce environmentally acceptable product water.

17 Claims, 9 Drawing Sheets

Related U.S. Application Data continuation-in-part of application No. 13/825,725, filed as application No. PCT/US2011/052858 on Sep. 23, 2011, now Pat. No. 9,567,249.

(60) Provisional application No. 61/386,427, filed on Sep. 24, 2010.

(51) Int. Cl.
| | | |
|---|---|---|
| *C02F 1/00* | (2006.01) | |
| *C02F 1/52* | (2006.01) | |
| *C02F 3/12* | (2006.01) | |
| *C02F 3/30* | (2006.01) | |
| C02F 1/44 | (2006.01) | |
| C02F 11/122 | (2019.01) | |
| C02F 101/10 | (2006.01) | |
| C02F 101/16 | (2006.01) | |
| C02F 101/20 | (2006.01) | |
| C02F 1/38 | (2006.01) | |

(56) References Cited

U.S. PATENT DOCUMENTS

| | | |
|---|---|---|
| 4,725,357 A | 2/1988 | Downing |
| 4,806,264 A | 2/1989 | Murphy |
| 5,271,831 A | 12/1993 | Oremland |
| 5,427,691 A | 6/1995 | Kuyucak |
| 5,993,667 A | 11/1999 | Overman |
| 6,113,797 A * | 9/2000 | Al-Samadi ........... B01D 61/022 210/650 |
| 2007/0114174 A1* | 5/2007 | Peeters ..................... C02F 3/06 210/605 |
| 2007/0163958 A1 | 7/2007 | Newcombe et al. |
| 2007/0187329 A1 | 8/2007 | Moller et al. |
| 2008/0257820 A1 | 10/2008 | Peeters et al. |
| 2009/0045135 A1 | 2/2009 | Khudenko et al. |
| 2010/0193436 A1 | 8/2010 | Ruehr et al. |
| 2011/0132839 A1 | 6/2011 | Zuback et al. |
| 2011/0163032 A1 | 7/2011 | Alexander et al. |

\* cited by examiner

CONCENTRATION OF WASTEWATER TO REDUCE FLOW RATE, COST, AND FOOTPRINT OF TREATMENT SYSTEM

RELATED APPLICATIONS

This is a continuation of and claims priority under 35 U.S.C. § 120 to U.S. patent application Ser. No. 15/347,427, filed on Nov. 9, 2016, titled "CONCENTRATING OF WASTEWATER TO REDUCE FLOW RATE, COST, AND FOOTPRINT OF TREATMENT SYSTEM," which is a continuation-in-part of and claims priority under 35 U.S.C. § 120 to U.S. patent application Ser. No. 13/825,725, filed on Sep. 4, 2013, titled "INTEGRATED SELENIUM REMOVAL SYSTEM FOR WASTE WATER," which is a national stage of and claims benefit under 35 U.S.C. § 371 to International Application No. PCT/US2011/052858, filed on Sep. 23, 2011, titled "AN INTEGRATED SELENIUM REMOVAL SYSTEM FOR WASTE WATER," which claims priority under 35 U.S.C. § 119(e) to U.S. Patent Application No. 61/386,427, filed on Sep. 24, 2010, titled "METHOD FOR THE REMOVAL OF SELENIUM FROM AQUEOUS SOLUTION TO VERY LOW LEVELS," each of which is incorporated herein by reference in its entirety for all purposes.

FIELD

Aspects and embodiments disclosed herein relate to removal of contaminants from contaminated water. More particularly, aspects and embodiments disclosed relate to a system and process to remove contaminants from contaminated water by concentrating and treating contaminated water.

SUMMARY

In accordance with an aspect, there is provided a system to remove contaminants from a contaminated water. The system comprises a pre-concentrating subsystem configured to receive a contaminated water and produce a concentrated contaminated water and a first product water, a contaminant removal subsystem comprising zero valent iron media in a reactor, or a biological subsystem, configured to receive the concentrated contaminated water and produce a second product water, and a permeate blending subsystem configured to receive the first product water from the pre-concentrating subsystem and all of the second product water from the contaminant removal subsystem and produce a second product water. The concentrated contaminated water may have between about 10% and 50% of a volume of the contaminated water and the first product water may have between about 50% and about 90% of the volume of the contaminated water. The contaminated water may have a first concentration of contaminants, and the concentrated contaminated water may have a second concentration of contaminants at least two times higher than the first concentration of contaminants. The contaminant removal subsystem may be configured to remove contaminants selected from the group consisting of selenium-containing compounds, nitrate-containing compounds, arsenic-containing compounds, and mercury-containing compounds from the concentrated contaminated water. Specifically, the contaminant removal subsystem may be configured to produce a second product water having a concentration of contaminants at least about 90% lower than the concentration of contaminants in the contaminated water and at least about 95% lower than the concentration of contaminants in the concentrated contaminated water. The permeate blending subsystem may be configured to produce a blended product water having a concentration of contaminants at least about 90% lower than the first concentration in the contaminated water by blending the first product water and the second product water.

In some embodiments, the pre-concentrating subsystem comprises a pressure driven membrane system. In other embodiments, the pre-concentrating subsystem comprises at least two pressure driven membrane systems fluidly connected in series.

In some embodiments, the pre-concentrating subsystem comprises a filter system configured to remove macroparticles from the contaminated water.

In some embodiments, the contaminant removal subsystem comprises a clarifier fluidly connected downstream of the reactor.

In some embodiments, the contaminant removal subsystem comprises zero valent iron media disposed in at least one reactor. In other embodiments, the zero valent iron media is disposed in at least one of a fluidized bed reactor, a packed bed reactor, or a mixed bed reactor.

In some embodiments, the system is configured to produce blended product water comprising less than about 5 ppb selenium-containing compounds. In other embodiments, the system is configured to produce blended product water comprising less than about 4.4 ppm nitrate-containing compounds. In other embodiments, the system is configured to produce blended product water comprising less than about 4 ppb arsenic-containing compounds. In other embodiments, the system is configured to produce blended product water comprising less than about 24 ppt mercury-containing compounds. In yet other embodiments, the system is configured to produce blended product water comprising less than about 24 ppm total dissolved solids.

In some embodiments, the system is configured to produce blended product water comprising less than about 5% of a concentration of selenium-containing compounds in the contaminated water. In other embodiments, the system is configured to produce blended product water comprising less than about 15% of a concentration of nitrate-containing compounds in the contaminated water. In other embodiments, the system is configured to produce blended product water comprising less than about 40% of a concentration of arsenic-containing compounds in the contaminated water. In yet other embodiments, the system is configured to produce blended product water comprising less than about 5% of a concentration of mercury-containing compounds in the contaminated water.

In accordance with another aspect, there is provided a process for removing contaminants from a contaminated water. The process comprises concentrating the contaminated water to produce a first product water and a concentrated contaminated water, contacting the concentrated contaminated water with a zero valent iron media or a biological subsystem to produce a second product water, clarifying the second product water to produce a sludge and clarified liquid, dewatering the sludge to produce a dewatered sludge and a dewatering liquid, disposing of the dewatered sludge, collecting the dewatering liquid, and combining the first product water and all of the clarified liquid to produce a blended product water. The first product water may have a concentration of contaminants lower than the contaminated water and the concentrated contaminated water may have a concentration of contaminants at least two times higher than the contaminated water. The second product water may have a concentration of contaminants at least 95% lower than the concentrated contaminated water. The contaminants may be selected from the group consisting of selenium-containing compounds, nitrate-containing compounds, arsenic-containing compounds, and mercury-containing compounds.

In some embodiments, the process for removing contaminants further comprises thickening the sludge prior to dewatering the sludge.

In some embodiments, concentrating the contaminated water comprises treating the contaminated water with a pressure driven membrane system. In other embodiments, concentrating the contaminated water comprises treating the contaminated water with at least two pressure driven membrane systems.

In some embodiments, concentrating the contaminated water comprises concentrating a volume of contaminated water and producing a first product water having about 50% to about 90% of the volume of the contaminated water and a concentrated contaminated water having about 10% to about 50% of the volume of the contaminated water.

In some embodiments, the process for removing contaminants further comprises pre-filtering the contaminated water with a filter system to remove macroparticles.

In accordance with another aspect, there is provided a method of facilitating removal of contaminants from a contaminated water. The method comprises providing a pre-concentrating subsystem fluidly connectable to a contaminated water and configured to concentrate the contaminated water and produce a concentrated contaminated water and a first product water, providing a contaminant removal subsystem comprising zero valent iron media in a reactor or a biological subsystem, fluidly connected to the pre-concentrating subsystem and configured to produce a second product water, and providing a permeate blending subsystem fluidly connected to the pre-concentrating subsystem and fluidly connected to the contaminant removal subsystem, configured to receive the first product water from the pre-concentrating subsystem and all of the second product water from the contaminant removal subsystem, and configured to produce a blended product water by blending the first product water and the second product water. The pre-concentrating subsystem may be configured to concentrate a volume of the contaminated water and produce a concentrated contaminated water having between about 10% and about 50% of the volume of the contaminated water and a first product water having between about 50% and about 90% of the volume of the contaminated water. The pre-concentrating subsystem may be configured to concentrate a concentration of contaminants of the contaminated water and produce a concentrated contaminated water having at least a majority of the contaminants of the contaminated water and a first product water having at most a minority of the contaminants of the contaminated water.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1A:
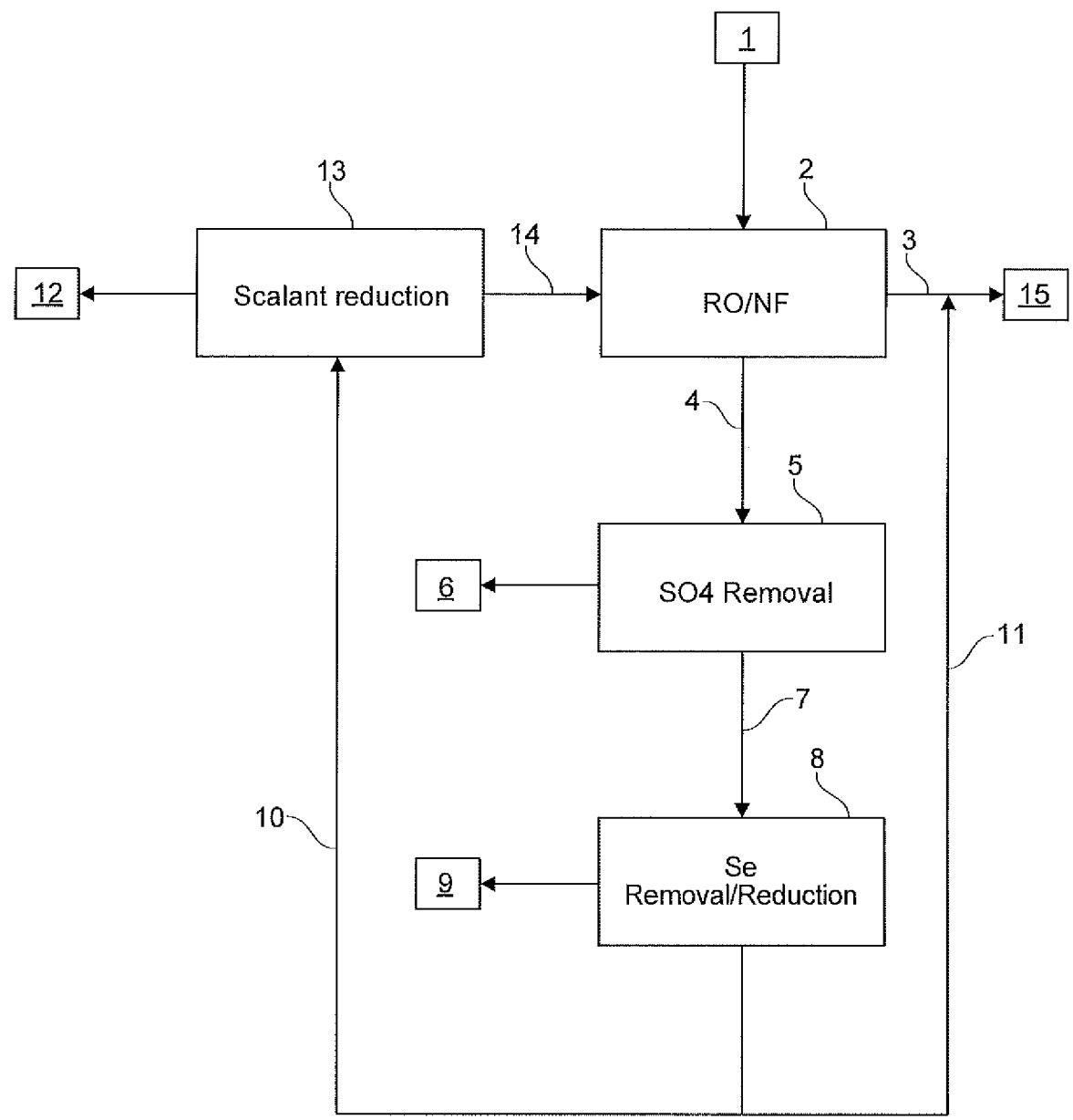
FIG. 1a shows block diagram of an embodiment of the inventive method with a sulfate removal process step in conjunction with a selenium reduction process step.
Figure 1B:
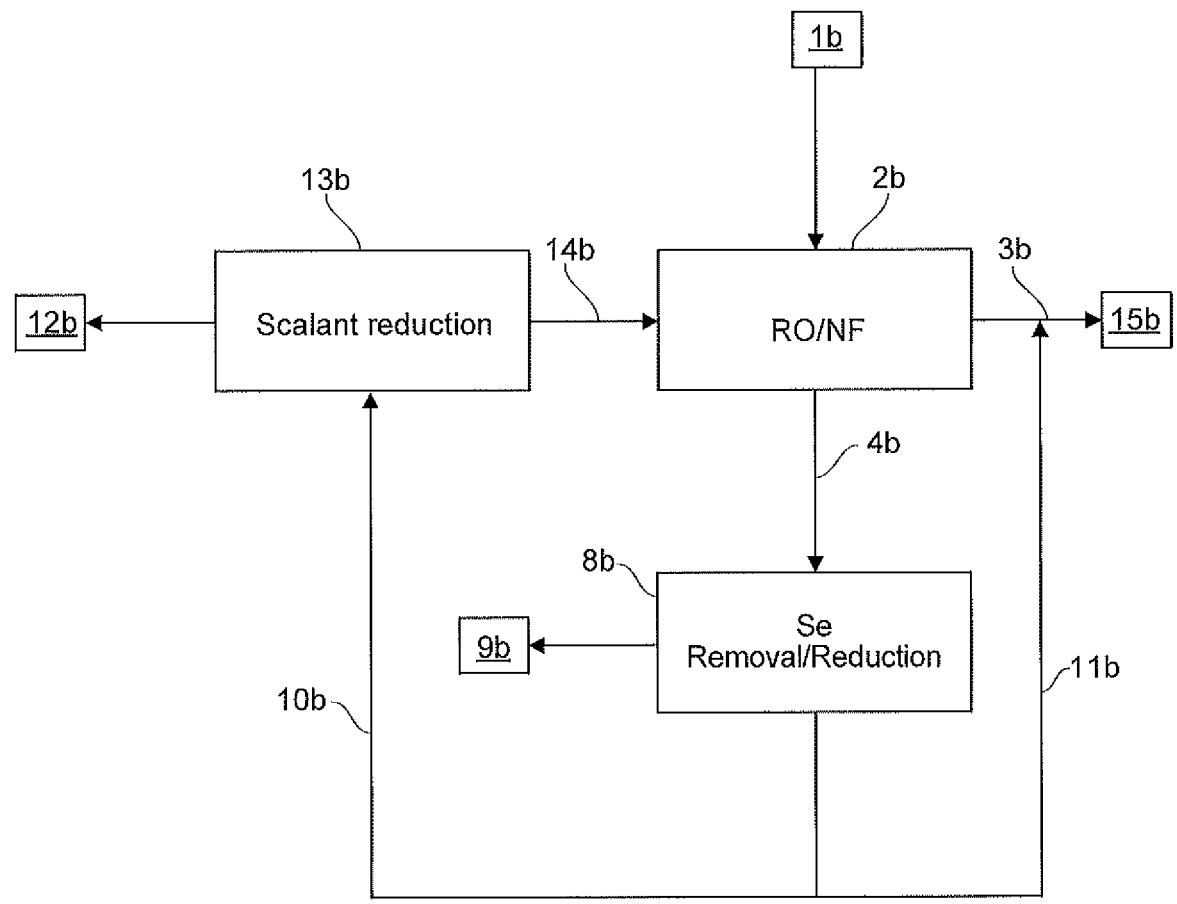
FIG. 1b shows block diagram of an embodiment of the inventive method with a selenium reduction process step.
Figure 1C:
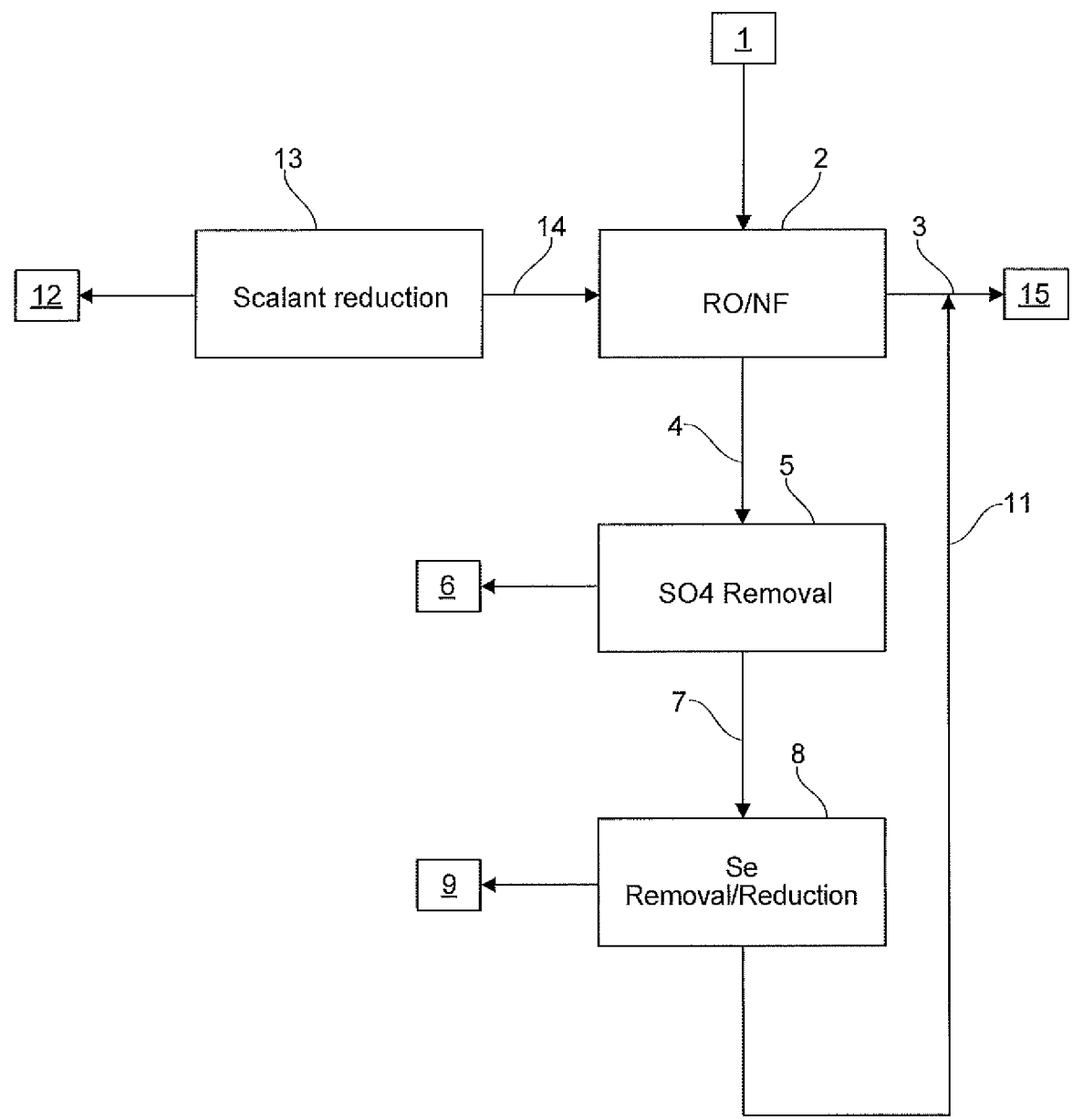
FIG. 1c is a block diagram of a contaminant removal subsystem which is substantially free of a recycle stream.
Figure 1D:
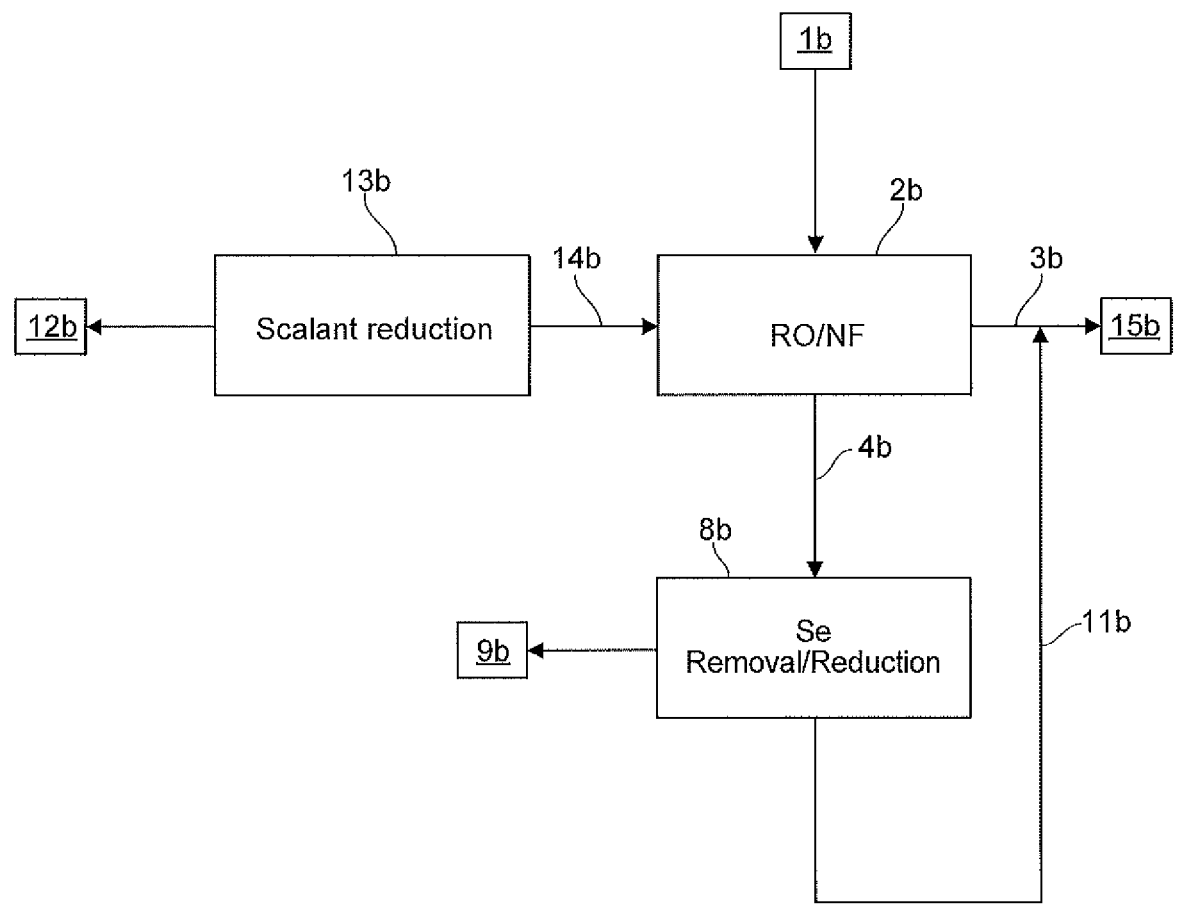
FIG. 1d is a block diagram of a contaminant removal subsystem which is substantially free of a recycle stream.

Current methods of treating dilute wastewater, for example, flue gas desulfurization wastewater or acid mine drainage wastewater, to remove contaminants such as heavy metals, metalloids, and organic chemicals, are limited by the low concentration of contaminants in the dilute wastewater and/or by the high volumes of contaminated wastewater. The low contaminant levels in dilute wastewater may be above mandated discharge limits and may desirably be reduced. The large volume of liquid that may be treated to reduce the dilute concentration of contaminants to acceptable levels may desirably be decreased.

Many power plants operating with dilute wastewater may close their fly ash ponds in the near future. There are strict regulations for the treatment of arsenic and selenium associated with these closures. Conventional treatment systems for wastewater from fly ash ponds are typically costly and typically have a large footprint. The closing power plants may find it increasingly difficult to meet the mandated treatment limits of their dilute wastewater.

Wastewater can be treated using a zero valent iron (ZVI) treatment system, for example, the Pironox® Advanced Reactive Media System (sold by Evoqua Water Technologies LLC, Warrendale, Pa.). One possible solution that may alleviate current issues is to introduce a component whereby wastewater can be concentrated prior to treatment. Concentrating the wastewater before ZVI treatment can significantly reduce footprint and cost of a ZVI system, making it a more viable option for treatment of dilute wastewater.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

According to some embodiments, a system to remove contaminants from a contaminated water comprises a pre-concentrating subsystem configured to receive a contaminated water and produce a concentrated contaminated water and a first product water, a contaminant removal subsystem comprising ZVI media in a reactor, configured to receive the concentrated contaminated water and produce a second product water, and a permeate blending subsystem configured to receive the first product water from the pre-concentrating subsystem and all of the second product water from the contaminant removal subsystem and produce a second product water. In some embodiments, the contaminant removal subsystem is configured to direct all of the second product water into the permeate blending subsystem. In some embodiments, the system to remove contaminants from a contaminated water is substantially or wholly free of a recycle feed.

In some embodiments, the pre-concentrating subsystem comprises a pressure driven membrane system. In other embodiments, the pre-concentrating subsystem comprises at least two pressure driven membrane systems fluidly connected in series. A downstream pressure driven membrane system may be configured to receive an intermediate product water from an upstream pressure driven membrane system and produce a concentrated contaminated water and a first product water. A pressure driven membrane system may be, for example, a reverse osmosis system (RO), a nanofiltration system, an ultrafiltration system, a microfiltration system, or combinations thereof. The pre-concentrating subsystem may comprise at least one electrically driven membrane system or at least one evaporative system.

In some embodiments, the pre-concentrating subsystem comprises a filter system configured to remove macroparticles from the contaminated water. The filter system may be a membrane filter system, a nanofiltration system, an ultrafiltration system, a microfiltration system, a screen filter, a sieve, a microporous filter, or combinations thereof. The filter system may be any separation system that captures microorganisms or particles primarily by surface capture.

In some embodiments the concentrated contaminated water may have between about 10% and 50% of a volume of the contaminated water. The concentrated contaminated water may have about 10%, 20%, 30%, 40%, or 50% of the volume of the contaminated water. In some embodiments, the first product water may have between about 50% and about 90% of the volume of the contaminated water. The first product water may have about 50%, 60%, 70%, 80%, or 90% of the volume of the contaminated water.

The contaminated water may have a first concentration of contaminants, and the concentrated contaminated water may have a second concentration of contaminants at least two times higher than the first concentration of contaminants. The concentrated contaminated water may have a second concentration of contaminants at least three, four, five, six, seven, eight, nine, or ten times higher than the first concentration of contaminants. Alternately, the concentrated contaminated water may comprise at least a majority of the contaminants of the contaminated water. In some embodiments, the concentrated contaminated water may comprise about all of the contaminants of the contaminated water.

As disclosed herein, aqueous concentrations are on a weight by volume (w/v) basis. For example, µg/L concentrations may be expressed as parts per billion (ppb) concentrations.

The first product water may have a concentration of contaminants lower than the concentration of contaminants in the concentrated contaminated water and lower than a concentration of contaminants in the contaminated water. The first product water may comprise at most a minority of the contaminants of the contaminated water. In some embodiments, the concentration of contaminants in the first product water may be negligible. As used herein, negligible refers to an insignificant or imperceptible amount. For example, negligible may be less than about 1% or less than about 0.5% of the concentration of contaminants in the contaminated water.

In some embodiments, the contaminant removal subsystem comprises ZVI media disposed in at least one reactor. The contaminant removal subsystem may comprise a series of reactors, each having ZVI media disposed within the reactor. The series of reactors may be fluidly connected downstream of each other in series, each reactor contacting contaminants in the concentrated contaminated water with ZVI media. The ZVI media may include at least one iron oxide compound. In some embodiments, the ZVI media is in the form of particles which may include, for example, nanoparticles and/or microparticles. The ZVI media may additionally or alternatively be in the form of steel wool. In some embodiments, the ZVI media is disposed in at least one of a fluidized bed reactor, a packed bed reactor, or a mixed bed reactor. In some embodiments, the ZVI media and/or the reactor or reactors containing the ZVI media is substantially or wholly free of microorganisms or bacterial populations capable of metabolically reducing ions of, for example, selenium, mercury, arsenic or other metals, or nitrates.

While not wishing to be bound by theory, it is believed that the zero valent iron acts as an electron generator to chemically reduce soluble metal cations and oxyanions to insoluble forms. During the reduction reaction, contaminants are adsorbed to the surface of the iron and are chemically incorporated into iron oxidation byproducts. Generally, iron metal can be used to reduce contaminant ions to their solid states which precipitate on the iron or to an insoluble contaminant-iron complex. Without wishing to be bound by theory, it is believed that ferric hydroxide reduces the contaminant ions in aqueous solution to their elemental state and is simultaneously oxidized to magnetite and maghemite, highly magnetic ferric oxides. The precipitated contaminants or contaminant-iron complexes may be collected and removed downstream of the at least one reactor comprising ZVI media by magnetic or other solid separation methods.

In some embodiments, the contaminant removal subsystem comprises a clarifier fluidly connected downstream of the reactor. The contaminant removal subsystem may further comprise one or more of an aeration tank fluidly connected to the contaminant removal subsystem, a thickener connected downstream of the clarifier for receiving sludge, and a dewatering system connected downstream of the clarifier or thickener for dewatering sludge. In some embodiments, the contaminant removal subsystem may comprise a continuous precipitation system, a supermagnet, a centrifuge, a filter or microfilter system, or a hydrocyclone for separation of solid particles. Sludge may be generated by one or more of flocculation, coagulation, and precipitation.

The contaminant removal subsystem may be configured to produce a second product water having a concentration of contaminants at least about 90% lower than the concentration of contaminants in the contaminated water. The second product water may have a concentration of contaminants at least about 75%, 80%, 85%, 90%, or 95% lower than the concentration of contaminants in the contaminated water. The second product water may have a concentration of contaminants at least about 95% lower than the concentration of contaminants in the concentrated contaminated water. The second product water may have a concentration of contaminants at least about 75%, 80%, 85%, 90%, 95%, 96%, 97%, 98%, or 99% lower than the concentration of contaminants in the concentrated contaminated water.

The contaminant removal subsystem may be configured to remove contaminants selected from the group consisting of selenium-containing compounds, nitrate-containing compounds, arsenic-containing compounds, and mercury-containing compounds from the concentrated contaminated water. The contaminant removal subsystem may be configured to remove dissolved ions of one or more contaminants. In other embodiments, the contaminant removal subsystem may be configured to remove one or more contaminants selected from the group consisting of aluminum-containing compounds, antimony-containing compounds, beryllium-containing compounds, cobalt-containing compounds, lead-containing compounds, cadmium-containing compounds, chromium-containing compounds, silver-containing compounds, zinc-containing compounds, nickel-containing compounds, molybdenum-containing compounds, thallium-containing compounds, vanadium-containing compounds, borates, bromates, iodates, periodates, trichloroethylene, dissolved silica, and combinations thereof. The compounds described above may be ions, dissolved ions, dissolved compounds, solid compounds, metals, metalloids, organic compounds, inorganic compounds, or a combination thereof.

In some embodiments, the permeate blending subsystem is configured to receive the first product water from the pre-concentrating subsystem and all of the second product water from the contaminant removal subsystem. The contaminant removal subsystem may be configured to direct all of the second product water into the permeate blending subsystem. In some embodiments, the system to remove contaminants from a contaminated water is substantially or entirely free of a recycle stream.

The permeate blending subsystem may be configured to produce a blended product water having a concentration of contaminants at least about 90% lower than the first concentration in the contaminated water by blending the first product water and the second product water. The blended product water may have a concentration of contaminants at least about 70%, 75%, 80%, 85%, 90%, 95%, 96%, 97%, 98%, 99% or greater, lower than the concentration of contaminants in the contaminated water.

The permeate blending subsystem may comprise one or more of a tank reactor, a rotating mixer, a fluid transporting conduit, a section of a fluid transporting conduit, or any reactor vessel capable of receiving more than one product stream and producing a blended product stream.

In some embodiments, the system is configured to produce blended product water comprising less than about 5 ppb selenium-containing compounds. The blended product water may comprise less than about 10 ppb, 9 ppb, 8 ppb, 7 ppb, 6 ppb, 5 ppb, 4 ppb, 3 ppb, 2 ppb, or 1 ppb selenium-containing compounds or dissolved ions of selenium.

In some embodiments, the system is configured to produce blended product water comprising less than about 4.4 ppm nitrate-containing compounds. The blended product water may comprise less than about 10 ppm, 9 ppm, 8 ppm, 7 ppm, 6 ppm, 5 ppm, 4.4 ppm, 4 ppm, 3 ppm, 2 ppm, or 1 ppm nitrate-containing compounds.

In some embodiments, the system is configured to produce blended product water comprising less than about 4 ppb arsenic-containing compounds. The blended product water may comprise less than about 10 ppb, 9 ppb, 8 ppb, 7 ppb, 6 ppb, 5 ppb, 4 ppb, 3 ppb, 2 ppb, or 1 ppb arsenic-containing compounds or dissolved ions of arsenic.

In some embodiments, the system is configured to produce blended product water comprising less than about 24 ppt mercury-containing compounds. The blended product water may comprise less than about 50 ppt, 42 ppt, 36 ppt, 30 ppt, 24 ppt, 18 ppt, 12 ppt, 6 ppt, or 1 ppb mercury-containing compounds or dissolved ions of mercury.

In some embodiments, the system is configured to produce blended product water comprising less than about 24 ppm total dissolved solids. The blended product water may comprise less than about 50 ppm, 42 ppm, 36 ppm, 30 ppm, 24 ppm, 18 ppm, 12 ppm, 6 ppm, or 1 ppm total dissolved solids.

In some embodiments, the system is configured to produce blended product water comprising less than about 5% of a concentration of selenium-containing compounds in the contaminated water. The blended product water may comprise less than about 15%, 10%, 9%, 8%, 7%, 6%, 5%, 4%, 3%, 2%, 1%, 0.5%, or 0.25% of the concentration of selenium-containing compounds in the contaminated water.

In other embodiments, the system is configured to produce blended product water comprising less than about 15% of a concentration of nitrate-containing compounds in the contaminated water. The blended product water may comprise less than about 25%, 20%, 15%, 10%, 5%, or 1% of the concentration of nitrate-containing compounds in the contaminated water.

In other embodiments, the system is configured to produce blended product water comprising less than about 40% of a concentration of arsenic-containing compounds in the contaminated water. The blended product water may comprise less than about 60%, 40%, 30%, 25%, 20%, 15%, 10%, 5% or 1% of the concentration of arsenic-containing compounds in the contaminated water.

In yet other embodiments, the system is configured to produce blended product water comprising less than about 5% of a concentration of mercury-containing compounds in the contaminated water. The blended product water may comprise less than about 15%, 10%, 9%, 8%, 7%, 6%, 5%, 4%, 3%, 2%, 1%, 0.5%, or 0.25% of the concentration of mercury-containing compounds in the contaminated water.

According to alternate embodiments, the system to remove contaminants from a contaminated water comprises a pre-concentrating subsystem configured to receive a contaminated water and produce a concentrated contaminated water and a first product water, a biological subsystem configured to receive the concentrated contaminated water and produce a second product water, and a permeate blending subsystem configured to receive the first product water from the pre-concentrating subsystem and all of the second product water from the contaminant removal subsystem and produce a second product water. In some embodiments the contaminant removal subsystem is configured to direct all of the second product water into the permeate blending subsystem.

In some embodiments, the biological subsystem comprises at least one reactor having at least one bacterial population capable of metabolically reducing ions of at least one contaminant to water insoluble metals or metal compounds, and at least one nutrient for the biological population, maintained under anaerobic conditions. The at least one bacterial population may be disposed in a porous matrix or a microbial biomass. The biological subsystem may further comprise one or more membrane filters. In some embodiments the biological subsystem operates in absence of ZVI media and is substantially or completely free of ZVI media. In other embodiments, the biological subsystem includes ZVI in addition to the at least one bacterial population, for example, as a matrix supporting or configured to support the at least one bacterial population.

According to some embodiments, a process for removing contaminants from a contaminated water comprises concentrating the contaminated water to produce a concentrated contaminated water and a first product water, contacting the concentrated contaminated water with a ZVI media to produce a second product water, and clarifying the second product water to produce a sludge and clarified liquid. The process for removing contaminants from a contaminated water may further comprise one or more of dewatering the sludge to produce a dewatered sludge and a dewatering liquid, disposing of the dewatered sludge, collecting the dewatering liquid, and combining the first product water and all of the clarified liquid to produce a blended product water.

The first product water may have a concentration of contaminants lower than the contaminated water, and the concentrated contaminated water may have a concentration of contaminants higher than the contaminated water. The second product water may have a concentration of contaminants lower than the concentrated contaminated water.

In some embodiments, the process for removing contaminants further comprises thickening the sludge prior to dewatering the sludge. The process for removing contaminants may further comprise pumping the sludge through a filter press for further dewatering.

In some embodiments, the process for removing contaminants may comprise separating at least some solid particles with one or more of a supermagnet, a centrifuge, a filter, or a hydrocyclone.

In some embodiments, the process for removing contaminants further comprises pre-filtering the contaminated water with a filter system to remove macroparticles. Pre-filtering the contaminated water may comprise filtering the contaminated water to separate microorganisms or particles by a surface capture method. The filter system may be a membrane filter system, a nanofiltration system, an ultrafiltration system, a microfiltration system, a screen filter, a sieve, a microporous filter, or combinations thereof.

In some embodiments, concentrating the contaminated water comprises treating the contaminated water with a pressure driven membrane system. In other embodiments, concentrating the contaminated water comprises treating the contaminated water with at least two pressure driven membrane systems. In some embodiments, the at least two pressure driven membrane systems may be in series. A pressure driven membrane system may be, for example, a reverse osmosis system (RO), a nanofiltration system, an ultrafiltration system, a microfiltration system, or combinations thereof. Concentrating the contaminated water may comprise treating the contaminated water with at least one electrically driven membrane system or at least one evaporative system.

In some embodiments, concentrating the contaminated water comprises concentrating a volume of contaminated water and producing a first product water having about 50% to about 90% of the volume of the contaminated water and a concentrated contaminated water having about 10% to about 50% of the volume of the contaminated water. As previously described, the concentrated contaminated water may have about 10%, 20%, 30%, 40%, or 50% of the volume of the contaminated water, and the first product water may have between about 50%, 60%, 70%, 80%, or 90% of the volume of the contaminated water.

In some embodiments, contacting the concentrated contaminated water with a ZVI media comprises contacting the contaminated water with ZVI media disposed in at least one reactor. The ZVI media may be disposed in a series of reactors. The ZVI media may include at least one iron oxide compound. The ZVI media reacts with the contaminants in the concentrated contaminated water to remove contaminants and produce a second product water. While not wishing to be bound by a particular theory, it is believed that the ZVI media reacts with ions, metals, metalloids, and contaminant containing compounds to precipitate dissolved compounds and adsorb at least some of the precipitated contaminant containing compounds. In some embodiments, the ZVI media is disposed in at least one of a fluidized bed reactor, a packed bed reactor, or a mixed bed reactor.

According to alternate embodiments, the process for removing contaminants from a contaminated water comprises concentrating the contaminated water to produce a first product water and a concentrated contaminated water, contacting the concentrated contaminated water with a biological subsystem to produce a second product water, and clarifying the second product water to produce a sludge and clarified liquid. The process for removing contaminants from a contaminated water may be at least partially carried out in a biological subsystem, as previously described.

According to other embodiments, a method of facilitating removal of contaminants from a contaminated water comprises providing a pre-concentrating subsystem fluidly connectable to a contaminated water, a contaminant removal subsystem comprising ZVI media in a reactor, and a permeate blending subsystem.

In some embodiments, the pre-concentrating subsystem is configured to concentrate the contaminated water and produce a concentrated contaminated water and a first product water. The pre-concentrating subsystem may be configured to concentrate a concentration of contaminants of the contaminated water and produce a concentrated contaminated water having at least a majority of the contaminants of the contaminated water and a first product water having at most a minority of the contaminants of the contaminated water. The method of facilitating removal of contaminants from a contaminated water may be at least partially carried out in a pre-concentrating subsystem, as previously described.

In some embodiments, the contaminant removal subsystem comprises ZVI media in at least one reactor and is fluidly connected to the pre-concentrating subsystem and configured to produce a second product water. The method of facilitating removal of contaminants from a contaminated water may be at least partially carried out in a contaminant removal subsystem, as previously described.

In some embodiments, the permeate blending subsystem is fluidly connected to the pre-concentrating subsystem and fluidly connected to the contaminant removal subsystem.

The permeate blending subsystem may be configured to receive the first product water from the pre-concentrating subsystem and all of the second product water from the contaminant removal subsystem, and produce a blended product water by blending the first product water and the second product water. In some embodiments the contaminant removal subsystem is configured to direct all of the second product water into the permeate blending subsystem. The method of facilitating removal of contaminants from a contaminated water may be at least partially carried out in a permeate blending subsystem, as previously described.

According to other embodiments, a method of facilitating removal of contaminants from a contaminated water comprises providing a pre-concentrating subsystem fluidly connectable to a contaminated water, a biological subsystem, and a permeate blending subsystem. The method of facilitating removal of contaminants from a contaminated water may comprise treating concentrated contaminated water in a biological subsystem, as previously described.

While selenium is an essential element for animals, toxicity may occur with as little as 5 mg/kg. Exposure to toxic levels manifests in birds and fish as embryo mortality and deformities, and poor post hatching survival. Selenium in the environment of these species may result from mining operations, for example, discharge from tailings impoundments, run-off from waste rock piles, discharge from fly ash ponds at fossil fuel combustion plants, or from impoundments or run-off from large scale agricultural irrigation.

Regulatory guidelines for the concentration level in North America for selenium discharge requirements are presently low and can be expected to trend lower. The United States Environmental Protection Agency (USEPA) has set the Maximum Contaminant Level (MCL) and the Maximum Contaminant Level Goal (MCLG) in drinking water for selenium at 0.05 mg/L. EPA has found selenium to potentially cause the following health effects when people are exposed to it at levels above the MCL for relatively short periods of time, hair and fingernail changes, damage to the peripheral nervous system, fatigue and irritability.

To meet future requirements, industrial and other discharging entities should plan on requirements of the order of 1-5 μg/L (ppb). Selenium discharges at this level are challenging because selenium exists in a variety of different forms, is usually at a dilute concentration, and treatment results in a concentrated residual which has to be disposed of without re-release of selenium.

The need for selenium removal or reduction technology has generated many approaches to this problem. These can be separated into four categories, each with their strengths and weaknesses. Practitioners desiring to select a technology may face two daunting problems, the difference in effectiveness exhibited by the technologies on different selenium ion forms, selenate ($Se^{6+}$ or SeVI) and selenite ($Se^{4+}$ or SeIV), and other organocomplexes, such as selenocyanate, and the deleterious effect of other ions, particularly sulfate ions on the various technologies.

1. Standard Desalting Techniques

The use of reverse osmosis (RO) and nanofiltration (NF) to remove selenium from water has been reported. Nanofiltration can remove selenate, but is less effective against selenite. Reverse osmosis is reported able to remove selenate and selenite to less than about 5 μg/L at full scale.

Ion exchange (IX) can remove selenate but is less effective for selenite. Sulfate which has almost equivalent ion exchange affinity decreases the effectiveness of IX for selenate. It has been reported that arsenic removal media, such as DOW Adsorbsia™ removes selenite, but not selenate.

2. Adsorption Techniques

Ferrihydrite (ferric oxyhydroxide mineral) precipitation, which may be used as a co-precipitate with ferric salts, effectively removes selenite, Se (IV) at pH<~8, but is not effective for selenate, Se(VI). Se (VI) should be reduced prior to adsorption. The presence of other aqueous species in the solution may influence the removal of Se (IV).

Activated alumina adsorbs selenite at pH levels between 3-8. Aqueous silica adsorbs in preference to selenite at pH 7 but is no problem at pH 4, but selenate adsorption by alumina is poor. Selenate adsorption drops off rapidly with increasing pH and is less than 50% at pH 7. Sulfate and carbonate adsorption significantly interferes with selenate adsorption.

3. Microbiological Processes

These are specific for selenate. The reaction residence time is hours, necessitating retention of large volumes of water or wastewater being treated in bioreactors. Nitrates and sulfates reduce effectiveness of this technique and should be removed or mitigated.

U.S. Pat. No. 4,519,913 describes a microbiological process that reduces the concentration of selenium ions in a waste solution by passing said waste solution through a treatment zone containing a porous matrix on which are retained populations of at least one bacteria of the genus *Clostridium* under anaerobic conditions, said bacteria being capable of metabolically reducing said selenium ions to water insoluble selenium metal. The water insoluble selenium metal resulting from this metabolic reduction is retained on the porous matrix and the resulting aqueous effluent has a lower water soluble selenium ion concentration.

U.S. Pat. No. 4,725,357 describes a method of removing dissolved hexavalent selenium from water by treating the selenium-containing water in a reactor containing microbial biomass and a nutrient for the biomass, substantially in the absence of free oxygen, to cause at least part of the selenium to be captured by particles having a size of 0.1 micron or greater; and passing the discharge from the reactor through a filter in order to filter out particles which captured the selenium. This method is suited for removing dissolved hexavalent selenium from water which contains a higher weight concentration of nitrate than of hexavalent selenium (measured as selenium). In such a process, the concentration of nitrate in the water is lowered to 5 mg/L or below, typically 2 mg/L or less.

In U.S. Pat. No. 5,271,831 a process for removing oxyanions of selenium by selenate respiring microorganisms may be obtained by reducing the nitrate concentration well below 1 mM. In this process, lowering of the nitrate concentration in selenium- and nitrate-containing waste water may be accomplished by employing a nitrate utilizing biomass under aerobic conditions in a first treatment zone to remove nitrate followed by a second treatment zone where an anaerobic microbiological reaction using selenate respiring microorganisms to affect the biological reduction of oxyanions of selenium to elemental selenium.

4. Chemical Reduction Processes

These processes reduce selenate to selenite or selenium, and flocculate and co-precipitate the selenium ions or metal for collection and disposal. Ferrous, aluminum and zinc salts are used with ferrous salts being the most common. Iron metal is used sometimes with copper catalyst to reduce selenium ions to selenium metal which precipitates on the iron or as an insoluble iron selenite with ferric hydroxide formed by simultaneous oxidation.

U.S. Pat. No. 4,405,464 describes a method to substantially reduce the concentration of selenium ions in the selenate oxidation state in an aqueous solution by contacting the aqueous solution with metallic iron. The metal iron reduces selenium ions in the Se (VI) oxidation state to at least the Se (IV) oxidation state, and the metallic iron is oxidized and hydrolyzed to form a ferric hydroxide precipitate. The inventors of '464 believe that the selenium is either precipitated on the iron by a cementation process or precipitated on the ferric hydroxide by adsorption of the reduced selenite ions upon the surface of the precipitate to form an insoluble iron selenite.

U.S. Pat. No. 4,806,264 uses ferrous hydroxide at pH levels between 8 and 10, preferably at about pH 9. Under these conditions, ferrous hydroxide reduces the selenium ions in an aqueous solution to elemental selenium and is itself oxidized to ferric oxides which are highly magnetic (magnetite and maghemite). The elemental selenium particles remain within the particles of the iron oxides and are collected and removed from the solution by magnetic means.

In U.S. Pat. No. 5,993,667 selenium is removed from selenium-containing water in a two stage process. The water is first cooled to approximately 80 to 90 degrees Fahrenheit and fed to a continuously stirred tank reactor where it is mixed with an aqueous solution of ferric sulfate or other soluble ferric salt to reduce the pH of the water and to produce a precipitate consisting of ferric hydroxide and ferric oxyhydroxide. In a second continuously stirred tank reactor, the treated water is mixed with an aqueous permanganate solution, causing the oxidation of the selenium to selenite and forming a manganese dioxide precipitate. The selenite is adsorbed on both the manganese dioxide and the ferric hydroxide, and is removed with them by centrifugation.

The Selenium Workgroup of The North American Metals Council (http://www.namc.org/selenium.html) has published a report (http://namc.org/docs/00062756.PDF) which extensively reviews the present state of selenium removal technology. They state; "While the physical, chemical and biological treatment technologies have the potential to remove selenium, there are few technologies that have successfully and/or consistently removed selenium in water to less than 5 µg/L at any scale. There are still fewer technologies that have been demonstrated at full scale to remove selenium to less than 5 µg/L, or have been in full scale operation for sufficient time to determine the long-term feasibility of the selenium removal technology. No single technology has been demonstrated at full scale to cost-effectively remove selenium to 5 µg/L for waters associated with all sectors. Therefore, performance of the technology must be demonstrated on a case specific basis."

The inventors have realized that to economically and efficiently meet selenium removal requirements for the various cases that may arise, they would see benefits from a flexibly designed and integrated process scheme. The inventors describe herein a process that may treat and recycle the input selenium containing water stream, discharging the major part of input selenium containing water as treated water that meets the local requirements for release. Local requirement means the discharge concentration set by one or more local, state or federal governmental agencies, or requirements of downstream processes to which the discharge is sent.

This process scheme described herein may comprise pumping or otherwise sending the selenium containing water to the inlet of a primary reverse osmosis treatment system to produce a primary permeate stream at least meeting the requirements of the location and a concentrate stream containing the removed selenium and other species, a RO concentrate treatment specific to the case which may treat and reduce the selenium content of the concentrate and result in a highly concentrated sludge or other output, and a selenium depleted aqueous overflow stream a portion of which may be combined with the primary permeate stream so the selenium content of the combined stream does not exceed the local requirement, and the reminder of the selenium depleted aqueous overflow stream which may be returned to be combined with the selenium containing water entering the inlet of the primary reverse osmosis treatment.

In one embodiment, the selenium containing water may be pretreated to remove sulfates and/or other sparingly soluble salts before entering the reverse osmosis system to reduce scaling and/or fouling of the RO membranes and to reduce RO retentate processing.

In some embodiments, the selenium in the retentate may be reduced in concentration by contact with metal iron. The iron may be steel wool.

In some embodiments, the selenium in the retentate may be reduced in concentration by anaerobic or anoxic microbiological reduction.

The selenium reduction of the RO retentate may be reduced in conjunction with a sulfate removal process which may produce a product stream having a combinable selenium content and a sulfate concentration that may reduce or eliminate scaling of the RO membranes.

A method by which the minimum ratio of RO permeate flow to amount of treated retentate able to be combined with the permeate and maintain selenium discharge at or below desired concentration is described.

Methods by which scaling materials may be removed from the remainder of treated retentate prior to return to RO inlet is described.

The varied water sources that may call for selenium removal or remediation would benefit from variations of the technology described herein. The inventors describe a flexible integrated process for treating a water source containing selenium ions, for example, but not limited to, selenite or selenate, that may produce a treated effluent stream with less than about 25 µg/L, less than about 10 µg/L, or less than about 5 µg/L of dissolved selenium, and a semi-solid or sludge stream having primarily chemically reduced selenium metal.

Reverse osmosis filtration is used to purify and/or desalinate water using a semipermeable membrane at elevated pressure. RO or NF membranes are fabricated into modules which separate the high-pressure feed stream from the lower pressure permeate stream. One or more modules are sealed in a container (housing). In operation, a high pressure feed is introduced into the housing and contacts one side or face of the membrane. RO is operated at pressures above the osmotic pressure of the feed, which is determined by the type and concentration of salts in the feed stream. The driving force for permeation through the membrane is related directly to the difference between the feed stream pressure and the osmotic pressure. The larger the difference (feed minus osmotic) the higher the permeation rate. Purified water, the permeate, passes from the higher pressure side and dissolved entities, such ions, are retained on the high pressure side of the membrane, denoted variously as the concentrate, retentate, or reject. The retentate stream exits the housing for further processing or disposal, depending on the use to which the RO/NF system is being applied.

Reverse osmosis membranes can be supplied in a variety of properties. Seawater membranes are used to desalinate seawater (equivalent to approximately 35,000 ppm NaCl) at pressure of 800-1500 psi. This type of membrane may retain over 99% of incident salt. Brackish water membranes operate at lower pressures in waters of lower ionic strength. They may have relatively lower inherent retention of salt ions, but have a higher permeability and when properly engineered, may operate economically. Nanofiltration membranes are so-called "loose" reverse osmosis membranes which retain multivalent ions at greater than about 95% rejection, but pass a larger percentage of monovalent ions through the membrane. They have relatively higher permeability than the previously described membranes. For simplicity, reverse osmosis, RO, or RO/NF may be used herein to refer to all the previous mentioned membranes.

Desalination practitioners commonly use once-through flow in reverse osmosis operations, practitioners also use concentrate recirculation, where the concentrate is returned to the feed storage tank. In relatively small applications, such as small scale waste water treatment, where intermittent or non-continuous discharge is used, a batch or semi-batch method is common. A batch operation is one in which the feed is collected and stored in a tank or other reservoir, and periodically treated. In semi-batch mode, the feed tank is refilled with the feed stream during operation.

The RO system may have single or multiple stages. In a single stage system, the feed passed through one or more pressure vessels arranged in parallel. Each pressure vessel may have one or more membrane modules in series. The number of stages in a multiple staged system is defined as the number of single stages the feed passes through before exiting the system. Permeate staged systems use permeate from the first stage as feed for the second stage, and if multiple stages are used, permeate from a stage just prior is used as feed for the following stage. In as reject staged system, the reject stream of a stage is sent to become the feed stream of a subsequent, usually the next, stage. Reject, concentrate and retentate and similar terms have synonymous meanings in RO processing.

RO systems can be engineered in a variety of conformations, depending on the amount of water to be processed, the feed concentrations and the required output. Reverse osmosis system design is the topic of several books, such as The Guidebook to Membrane Desalination Technology: Reverse Osmosis, Nanofiltration and Hybrid Systems Process, Design, Applications and Economics (Wilf, M., et al; Desalination).

Water to be treated is usually held in a lagoon, pond, storage tank or similar facility. Before entering the treatment process train, a prefiltration step may be used to protect the RO/NF system by removing particles, organic matter, bacteria, and other contaminants. Slow sand filtration may be used. Another method is dual media sand filtration. This method uses a layer of anthracite over a layer of fine sand. Other methods may be used singularly or in combination. These include, but are not limited to, mixed media filtration, non-woven fabric cartridge filtration, and membrane filtration.

Ultrafiltration and microporous membrane filtration, while more expensive, has become more popular because these technologies remove colloidal species more effectively than traditional clarification and filtration methods.

Flocculation, coagulation and precipitation may also be used. However, these methods generate large quantities of sludge. Also, aluminum residuals from alum coagulation may cause colloidal fouling of RO membranes by formation of aluminum silicates. Moreover, polyvalent metal ions, such as used in lime or other precipitation methods, (i.e., iron, aluminum, calcium, magnesium, etc.) can cause silica absorption or complexes and catalyze silica polymerization.

Depending on the feed water source, silica fouling may be a significant problem for RO/NF operation. Silica solubility limits water use in applications such as cooling, boiler, and reverse osmosis (RO), and geothermal applications. Silica concentrations above about 150 to 180 mg/L at ambient temperatures may cause accelerated fouling due to limited silica solubility. At these concentrations, and especially above about 180 mg/L, reactive silica polymerizes to form colloidal silica which may foul membranes and may even plug the feed spacer in membrane modules.

Silica in water is in the reactive or unreactive form. The reactive form refers to monomeric $SiO_4$. The polymerized form results when the silica concentration exceeds the saturation limit at the use conditions. Unreactive silica consists of polymerized silica as well as colloidal and granular silica.

Much R&D has gone into silica control technology in aqueous systems. Three approaches are primarily used.

Inhibiting silica polymerization

Increasing the silica solubility as it forms

Dispersion of precipitated silica and silicate compound using polymeric dispersants Magnesium silicate is commonly encountered in RO systems. Magnesium silicate precipitation depends on solution pH and temperature. Above pH 9, magnesium hydroxide and silicate ions are prone to form magnesium silicate. Hydroxide salts such as calcium, strontium, and sodium, may also react with silicate ion, but produce more soluble products and have less fouling potential.

The use of boric acid and/or its water soluble salts to control silica based deposits in cooling water systems operating at 250 to 300 mg/L silica has been reported. However, boric acid is poorly rejected by RO and may lead to problems downstream (effluent discharge limitations on boron).

Solution pH governs silica polymerization. At high silica concentrations, higher pH generates the problem of magnesium silicate scale. Reducing pH simply changes the problem from magnesium silicate to silica.

Chemical methods are also used. Silica inhibitors retard polymerization of monomeric silica. Dispersants place a repelling charge on the silica particle surfaces, which prevent combining and enhance silica particle dispersion in to the water. This subject has been much studied and many chemical and polymer systems have been reported. Examples of polymeric silica dispersants are polyacrylamide-based treatment programs, phosphonate and a copolymer of acrylic acid and 2-acrylamido-2-methylpropane sulfonic acid and hydroxyphosphonoacetic acid and a copolymer of acrylic acid and allyl hydroxy propyl sulfonate. Much of developed products and formulations are proprietary.

Silica is sometimes called the recovery limiting component of a water being desalinated. In RO operation, the high pressure feed stream is imposed on and flows across one side of the membrane and purified water is removed from the other side. The purified flow is the permeate or product stream. The feed side retains the majority of dissolved species, and usually less than 5%, and more usually, less than about 1% of salts and other species pass through the membrane. This causes species concentration in the feed side to increase. The stream being removed is the recovery stream, which is what remains of the feed steam minus the permeate. The recovery stream is not to be confused with process recovery, which may be called permeate recovery herein. The recovery stream carries away the concentrate or rejected species. Permeate recovery, or simply recovery is defined mathematically as the ratio of permeate flow to feed flow, P/F, expressed as a percentage, limits RO operation in two ways. As the concentration in the feed side increases, osmotic pressure increases, which reduces the driving force for permeation. If the solubility limit of a species is reached, precipitation may occur on the membrane surfaces, and the resulting membrane fouling may decrease permeation, reducing productivity, or may benefit from an increase in pressure, increasing energy costs.

Permeate recovery for lower salt containing brackish waters typically are in the range of about 70% to 80%. For seawater, with about 35,000 mg/L salt, recovery can be about 35%. Concentrate flow is a major cost factor as it is high pressure waste. Practitioners seek to increase the percentage of permeate flow, i.e., product recovery, and decease retentate or concentrate flow. Decreasing concentrate flow is limited by silica precipitation due to the increase in solute concentration. Therefore methods for increasing product recovery or reducing concentrate flow may be beneficial to the desalination industry.

Reference articles such as UltraPure Water, Vol. 16, No. 2, February 99, Tall Oaks Publishing, 1999, and Desalination, Volume 167, 15 Aug. 2004, Pages 257-272 describe such systems. Commercial chemical systems generally combine inhibitors, dispersants and anti-scalants in various combinations for different waters. Examples are Perma-Treat® PC-510 (Ondeo Nalco, Naperville, Ill. 60563) and Carbosperse™ K-XP212 Copolymer (Lubrizol Corp Wickliffe, Ohio 44092).

Acid mine drainage (AMD), or a similar problem, Acid Rock Drainage, represents a large source of sulfate containing waters. Acid mine drainage (AMD) is low pH water arising from oxidation of iron and other sulfides to sulfuric acid. It is usually considered as water that flows from coal mines or mining waste or tailings, but can occur in metal mining, highway construction and other deep excavations. AMD is a common term sometimes used to refer to any mine operation discharge, many of which are alkaline.

High concentrations of sulfates in water sources present problems to wetlands and their wildlife inhabitants. Sulfates can stimulate microbial sulfate reduction (MSR) wherein sulfate reducing bacteria (SRB) produce sulfide from sulfate in the course of degrading inorganic matter and which controls the methylation and bioaccumulation of neurotoxic methyl mercury (MeHg) in wetlands and swampy areas. MeHg is a potent neurotoxin that bioaccumulates in fish and other wildlife. Other deleterious effects of high levels of sulfates are the generation of hydrogen sulfide and the accelerated release of nitrogen and phosphorous from soils, termed autoeutrophication.

Operators of RO/NF systems, particularly those processing difficult feed waters, such as acid mine drainage, produced water from petroleum drilling operations and waste water remediation face operating problems caused by high levels of multivalent ions such as calcium, magnesium, barium, etc. cations, or sulfate anions. There may be occasions where the operator of a RO/NF process may use a sulfate removal operation to reduce the level of these ions as part of a pretreatment scheme in to reduce membrane scaling or fouling and simplify the post RO/NF process.

The traditional treatment of AMD is with lime and limestone to neutralize acidity and precipitate out calcium sulfate (gypsum). However, relatively high levels of sulfate remain. Depending on composition and ionic strength, sulfate concentrations of about 1500 mg/l to up to 4000 mg/l, may remain after such treatments. Calcium content is also high due to the lime treatment, and there are other metal ions present as well.

Figure 2:
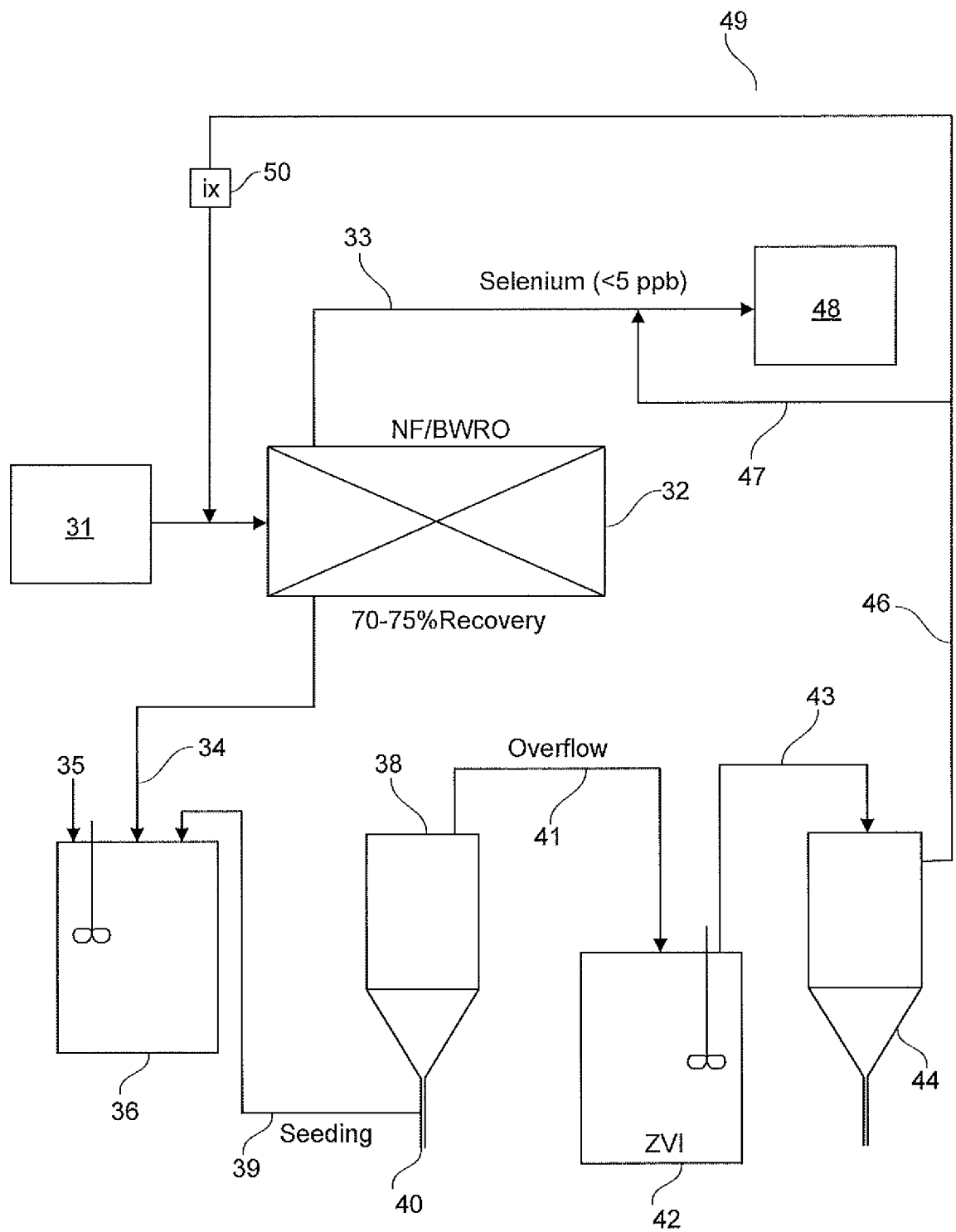
FIG. 2 illustrates a process design for selenium removal with retentate recycle.

US published patent application 2011/0132839 describes a process for reducing sulfate levels of a water source. The preferred process comprises a novel combination of ion exchange, reverse osmosis (RO) and precipitation to treat of high sulfate bearing streams. FIG. 2 shows an outline of the preferred process steps. In this process calcium is removed from the feed stream by SAC (strong acid cation) ion exchange resin and exchanged for the counterion of the SAC. A preferred counterion is sodium. The SAC step is followed by sulfate concentration using preferably a membrane separation process, more preferably, a reverse osmosis (RO) process. A descriptor of concentration is the ratio defined as the sulfate concentration going to the sulfate precipitation process step (described below) divided by the sulfate concentration of the stream leaving the SAC step. RO concentrate containing $Na_2SO_4$ is then mixed with spent regenerant ($CaCl_2$) to precipitate out gypsum ($CaSO_4$). A process step comprising carbonate precipitation in which sodium carbonate is added to the overflow stream of the gypsum precipitation step produces further reduction of calcium concentration. The effluent from carbonate precipitation is concentrated with an RO system producing a NaCl brine solution which is employed for regenerating the SAC ion exchange beds. The advantage of this process is that the use of chemicals is minimized by treating, reconcentrating and recycling regenerant after mixing with RO concentrate. The process also minimizes capital expenditure by precipitation of only side stream flows. An important attribute of the overall process is that each step contributes to improving the effectiveness of a subsequent step.

US published patent application 2011/0163032 describes a process for RO desalination for water sources that are high in silica concentration. The water feed is first filtered with a particle removing filter, preferably a microporous (MF) or ultrafiltration (UF) membrane filter, more preferably, a backwashable microfiltration or ultrafiltration membrane filter to remove suspended solids that could otherwise foul the RO membranes. A silica dispersant is introduced prior to the RO step and the water recovery in the RO is controlled to the percent recovery point where the silica concentration in the RO reject does not exceed the dispersant manufacturer's recommendation.

Some or all of the primary RO concentrate is preferably filtered by a microporous or ultrafiltration membrane, more preferably, a backwashable microfiltration or ultrafiltration membrane filter and the filtrate is further treated with RO. This microporous or ultrafiltration membrane can be either the same as used for pretreatment ahead of the RO or a separate MF or UF dedicated to only receive RO concentrate as its feed. In the former case, the feed to the MF may be a blend of recycled RO concentrate and feed water. In the latter case, the MF or UF filtrate can be either introduced to the feed of the primary RO, or alternatively introduced to a separate or secondary RO for further treatment and salt concentration.

Backwashing physically removes solids accumulated in a membrane module during filtration. Gas, usually air (gas backwash) or pumped filtrate (liquid backwash) is forced through the membrane filter from the permeate side to the feed side. Backwashing is done periodically or as desired to maintain permeation rate, either automated or manually.

The technique could potentially be applied to remove other dispersed species or dispersed colloidal solids from RO concentrate such as but not limited to calcium fluoride, sulfate, phosphate, etc. where the dispersed colloidal particles are filterable with MF or UF, either alone or in conjunction with a coagulant chemical added to the feed prior to the MF or UF. The technique could be extended to other concentration processes where chemicals must be used to prevent precipitation of silica and salts that exceed their solubility limit in the concentrate. Examples include evaporators and cooling towers.

The method removes silica by a combination of a chemical dispersant and a membrane filter to removed dispersed silica. Other colloidal and particulate entities may also be removed concurrently. Concentrate recovery plays an important role in this process, so it is important that the silica be brought to a state which may allow removal from the stream.

Operators of embodiments of the invention described herein, particularly those processing difficult feed waters, such as acid mine drainage, produced water from petroleum drilling operations and waste water remediation may face operating problems caused by high levels of multivalent ions such as calcium, magnesium, barium, etc. cations, or sulfate anions. There may be occasions where the operator of these embodiments may use a sulfate removal operation to reduce the level of these ions as part of a pretreatment scheme to reduce scaling or fouling and simplify the post RO/NF process.

FIGS. 1$a$ and 1$b$ are block diagrams illustrating the basic process. In FIG. 1$a$, a pretreated water stream 1 is fed to a reverse osmosis or nanofiltration system 2, designated RO/NF for convenience, to separate the stream into a purified water product effluent stream having a reduced selenium content 3 and a concentrate or retentate stream 4 containing the removed species, including selenium salts. Stream 4 then enters a sulfate removal step 5. In this step sulfate is separated from the water stream. Practitioners skilled in liquid-solid separations may be able to choose one or more methods based on engineering, regulatory agency's requirements and costs. Without being limited by the following, examples of such processes are; precipitation of sulfate by lime to form gypsum, or by removal by strong acid cation ion exchange. Stream 6 in FIG. 1$a$ is the solid or sludge precipitate of sulfate and other salts that may be entrained, by for example, a lime precipitation process step. Stream 7 is the overflow stream, depleted of sulfate, which is fed to the selenium reduction step. The type and scope of the sulfate removal process step depends on the concentration of sulfate and other salts in the membrane system retentate stream and how the retentate stream may affect downstream steps.

FIGS. 1$c$ and 1$d$ are block diagrams of a system for removing contaminants. The systems illustrated in FIGS. 1$c$ and 1$d$ are substantially free of a recycle stream.

The selenium reduction step 8 is used to chemically reduce oxyanions of selenium to elemental selenium and selenium ions precipitated or co-precipitated by the process which can be recovered. A method that uses selenate respiring microorganisms under anaerobic conditions to produce elemental selenium is described in U.S. Pat. No. 5,271,831, incorporated by reference. U.S. Pat. No. 4,405,464, incorporated by reference, discloses treating aqueous selenate with iron under pH conditions favoring iron hydroxide and elemental selenium formation. Without being limited to these processes, these examples show processes to remove oxyanions of selenium from a water stream which may be used in the integrated process described herein.

The selenium removal step 8 of FIG. 1$a$ separates the inlet stream into a selenium containing sludge in the case of the biological process or a ferrous sludge in the case of the iron process and an overflow stream containing reduced selenium content. A portion 11 of the overflow is blended with the effluent stream of the RO/NF process step in a controlled manner so that the combined stream 15 does not contain selenium above the desired concentration. The remainder of overflow from process step 8, stream 10 is optionally sent to a scalant reduction process 13 for treatment of sparingly soluble ions or excess calcium or other multivalent ions. Step 13 may be valuable in situations where the concentration of dissolved species in the overflow from step 8 may precipitate or otherwise foul the membranes of the RO/NF system. The output stream from step 13, stream 14, is combined with the feed stream 1. Stream 12 is, for example, the brine regeneration if an ion exchange process is used for scalant reduction process 13.

FIG. 1$b$ shows the basic process without a sulfate removal step. This process may be used in situations where sulfate concentrations are low, or where the pretreatment of the water source includes a sulfate removal step or process. In FIG. 1$b$, a pretreated water stream 1$b$ is fed to a reverse osmosis or nanofiltration system 2$b$, designated RO/NF for convenience, to separate the stream into a purified water product effluent stream 3$b$ having a reduced selenium content and a concentrate or retentate stream 4$b$ containing the removed species, including selenium salts. The selenium removal step 8$b$ of FIG. 1$b$ separates the inlet stream into a selenium containing sludge in the case of the biological process or a ferrous sludge in the case of the iron process and an overflow stream containing reduced selenium content. A portion 11$b$ of the overflow is blended with the effluent stream of the RO/NF process step in a controlled manner so that the combined stream 15$b$ does not contain selenium above the desired concentration. The reminder of overflow from process step 8$b$, stream 10$b$ is optionally sent to a scalant reduction process 13$b$ for treatment of sparingly soluble ions or excess calcium or other multivalent ions. Step 13$b$ may be valuable in situations where the concentration of dissolved species in the overflow from step 8$b$ may precipitate or otherwise foul the membranes of the RO/NF system. The output stream from step 13$b$, stream 14$b$, is combined with the feed stream 1$b$.

An illustrative process flow diagram of the proposed integrated process is schematically shown in FIG. 2. This diagram is not meant to limit the invention to this embodiment, but is meant to illustrate the basic steps of the process so that a skilled practitioner may adapt the process, further relying on the description in this specification, to any specific case. The feed (influent) water 31 is first introduced to the NF or RO system 32. The selenium rejection by these membranes are more than 95% and therefore the permeate quality may be qualified for direct discharge. The reject/concentrate stream may have high concentration of sulfate. A common method to reduce sulfate content is by chemical precipitation by lime addition. The overflow from the sulfate clarifier is sent to a step where selenium is chemically reduced and precipitated. The clarifier effluent of the Se reduction may have less than 1000 ppm of sulfate and 10-20 ppb of selenium. The effluent can partially be blended with the permeate stream and remaining effluent may be sent back to feed influent. The overall recovery through this process may be about >95%.

An IX step 48 is shown as a method to remove residual calcium to minimize the calcium sulfate scaling of the RO or NF membranes. Alternatively an antiscalant may be added into the RO feed to suppress $CaSO_4$ scaling.

In operation, the feed (influent) water 31 is first introduced to the NF or RO system 32. For the purposes of this discussion, the flow rate is 5 gallons per minute (gpm), containing 100 ppb selenium as selenate and/or selenite and 2000 ppm sulfate ($SO_4=$). The feed water is separated by the membrane system into a permeate stream 33 with a flow rate of 3.75 gpm reduced selenium content, here under 5 ppb selenium and a concentrate stream 34 at 1.25 gpm containing 400 ppb selenium and 8000 ppm sulfate.

The concentrate is sent to a stirred tank reactor 36 where it is combined with lime 35 and sent through line 37 to clarifier 38 in which sulfate precipitate settles to the bottom and is removed as a sludge stream 40 and clarified water, reduced in sulfate, is sent by line 41 to a selenium reduction step, here indicated as an iron or ZVI (zero valence iron) chemical reduction of selenium and ferrous/ferric precipitation process step. A portion of the sulfate sludge stream 39 may be returned to stirred tank 36 to act as seed for initiating precipitation.

As a result of the iron/selenium reaction, selenium is removed as an iron/selenium metal and/or a ferrous/ferric hydroxide/selenium (usually selenite) precipitate. The clarifier 44 splits the output into an iron sludge 45 and a clarified water stream 46. This stream is further split into a stream which is combined with the RO permeate 47 to form the total effluent flow 48, (see below) and the remainder 49 is returned to the influent 31. Depending on multivalent ion content, particularly calcium ions, an ion exchange 50, preferably a strong acid cation exchange may optionally be used to prevent scale formation on the membrane surface. Alternatively an antiscalant may be added into the RO feed to suppress $CaSO_4$ scaling.

The practitioner may control stream 47 depending on the flow rate and selenium content of the RO permeate and the selenium content of clarifier overflow stream 46.

In order to be able to combine a portion of stream 46 with permeate stream 33 one or both streams have to have Se content lower than the design effluent content. The design effluent content may be set to meet regulatory agencies mandates or for other process needs.

As an illustration, sample calculations in Table 1 below show how a practitioner of this technology would control flow 47 to maintain the selenium content of the total effluent below 5 ppb Se when the permeate stream content is below the design effluent content.

Table 1 shows how overflow rate portion 47 and concentration affect final effluent concentration.

This is calculated from the equation; RO permeate flow X Permeate concentration+overflow rate X overflow concentration divided by the total effluent flow, that is, permeate plus overflow. Or;

$$(Jp \cdot Cp + Jo \cdot Co)/Jp + Jo = Q \qquad \text{Equation 1}$$

where;
Jp=permeate stream flow rate
Jo=clarifier overflow portion combined with Jp
Cp=permeate Se content
Co=clarifier overflow portion Se content
Q=maximum design or regulated effluent Se content It is apparent that the RO permeate has to be below the desired Se concentration in the case where the overflow from the Se clarifier may have a higher Se concentration than required by local specifications. By changing the overflow amount (stream 47) sent to be combined, the total effluent Se content can be controlled to below the required effluent Se concentration, here assumed as 5 ppb.

Equation 1 may be rearranged to calculate the maximum Jo for any Jp.

$$Jp/Jo = (Q - Co)/(Cp - Q) \qquad \text{Equation 2}$$

If the Se clarifier overflow stream 46 is lower than the permeate stream, and the permeate stream is above design content, then in a similar manner, a portion of the permeate stream may be combined with stream 46 and the remainder may be returned to the feed inlet.

The design implications of the relation between the content of the two flows is shown in Table 1 below.

TABLE 1

| Permeate Se content | Overflow Se content | Design Implication |
|---|---|---|
| Cp < Q | Co < Q | May combine up to 100% |
| Cp < Q | Co > Q | Use Eq 2 to calculate flow ratio and amount of Jo that can be added to Jp |
| Cp > Q | Co > Q | Process does not meet design |
| Cp > Q | Co < Q | Use Eq 2 to calculate flow ratio and amount of Jp that can be added to Jo and return uncombined permeate to feed inlet |

In the calculated results of Table 2 below, the flow rates of the RO permeate stream and the portion of the clarifier overflow stream that are illustrated in FIG. 2 are used to show the relative flow rates that may be used to obtain a total process effluent meeting the design and/or regulatory requirements for maximum selenium discharge, here designated Q. Two levels of Cp, permeate selenium concentration, and two levels of Co, the selenium concentration in the selenium removal clarifier overflow are used with several values of Jo. Jo is the flow rate of the portion of the selenium removal clarifier overflow combined with the permeate flow to make up the total process effluent. In the calculations Q=5 ppb. Co is greater than Q in these calculations.

The user of this process would be able to determine, by this type of calculation, flow rates for Jo that allow a total effluent content less than Q.

The benefits of being able to combine a portion of the selenium removal clarifier overflow with the RO permeate stream and also control the total process effluent selenium content to below Q lie in the fact that the user does not have to have a process that reduces the concentrated selenium of the retentate stream to below the Q value. This may allow the user to adapt more easily to changes or variations in retentate concentrations. Furthermore, by recycling the clarifier overflow, in essence the RO retentate, the size and residence time of the downstream sulfate removal, if used, and the selenium removal processes may be reduced since a high level of Se removal to attain a effluent equal or lower than Q from these steps is not needed. This ability may reduce capital and operating costs.

TABLE 2

Effect of Jo on Effluent Se Concentration

| RO perm flow | RO perm SE (ppb) | Overflow | Overflow conc | Effluent (ppb) |
|---|---|---|---|---|
| 3.75 | 3 | 2 | 10 | 5.43 |
| 3.75 | 3 | 1 | 10 | 4.47 |
| 3.75 | 3 | 0.5 | 10 | 3.82 |
| 3.75 | 4 | 2 | 10 | 6.09 |
| 3.75 | 4 | 1 | 10 | 5.26 |
| 3.75 | 4 | 0.5 | 10 | 4.71 |
| 3.75 | 4 | 0.1 | 10 | 4.16 |
| 3.75 | 3 | 2 | 20 | 8.91 |
| 3.75 | 3 | 1 | 20 | 6.58 |
| 3.75 | 3 | 0.5 | 20 | 5.00 |
| 3.75 | 4 | 2 | 20 | 9.57 |
| 3.75 | 4 | 1 | 20 | 7.37 |
| 3.75 | 4 | 0.5 | 20 | 5.88 |
| 3.75 | 4 | 0.1 | 20 | 4.42 |

Practitioners of the technology described herein may be able to take advantage of being able to combine a portion of the clarifier overflow with the permeate or combine a portion of the permeate with the clarifier overflow depending on the effectiveness of the RO of NF system and the effectiveness of the selenium removal process in the particular situation faced.

If it is desired to have a low permeate content, the practitioner may choose to use a multistage permeate staged Ro or NF process. In this type of process the permeate the first stage is fed to the inlet of the second stage, and if needed, the permeate from that stage is fed to a third stage, etc. The concentrate from the second and subsequent stages is purer than the inlet feed and may be returned to the incoming feed inlet to improve process system recovery.

RO or NF system recovery is defined as the permeate flow divided by the feed flow. Permeate staged RO process may result in lower Se content final permeate since the stream is membrane treated more than once.

A practitioner may desire to reduce the volumetric load on the downstream processes. The practitioner then may choose to increase system recovery by an RO or NF concentrate recovery process. In one version of this type of process, the concentrate stream is fed to a subsequent stage for RO or NF treatment, thereby reducing the final concentrate volume to be sent to sulfate and selenium removal process steps.

In other cases, usually for smaller operations, the practitioner may use a batch RO or NF process, where a feed tank or similar holds the feed volume and is processed with RO or NF concentrate return to the tank until tank concentration becomes high enough so that RO or NF rejection declines to a level that does not allow meeting design effluent Se content. The concentrated tank contents would be periodically emptied and treated for sulfate removal, if required and selenium removal. The practitioner would have the choice of designing the overall process to have some or all of the permeate held in a tank or pond, etc., to be combined with some or all of the selenium clarifier overflow stream to make up the final effluent.

Rather than a batch process, a semi-batch or fed tank process may be used. In the processes, the concentrate is returned to the feed tank and feed is added to make up for permeate or a portion of the permeate removed. Further processing options are as described for a batch operation.

Figure 6:
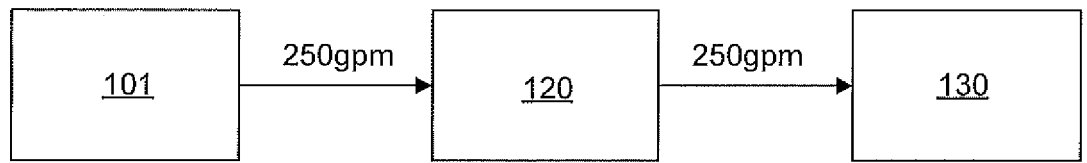
FIG. 6 is a block diagram of a contaminant removal subsystem.

FIG. 6 is a block diagram of a contaminant removal subsystem. In the system shown in FIG. 6 a contaminant removal subsystem 120 receives water from a contaminated water source 101 and produces effluent 130. As exemplary flowrates the contaminated water source 101 provides 250 gpm of contaminated water directly to the contaminant removal subsystem 120, which produces effluent 130 at a rate of 250 gpm.

Figure 7:
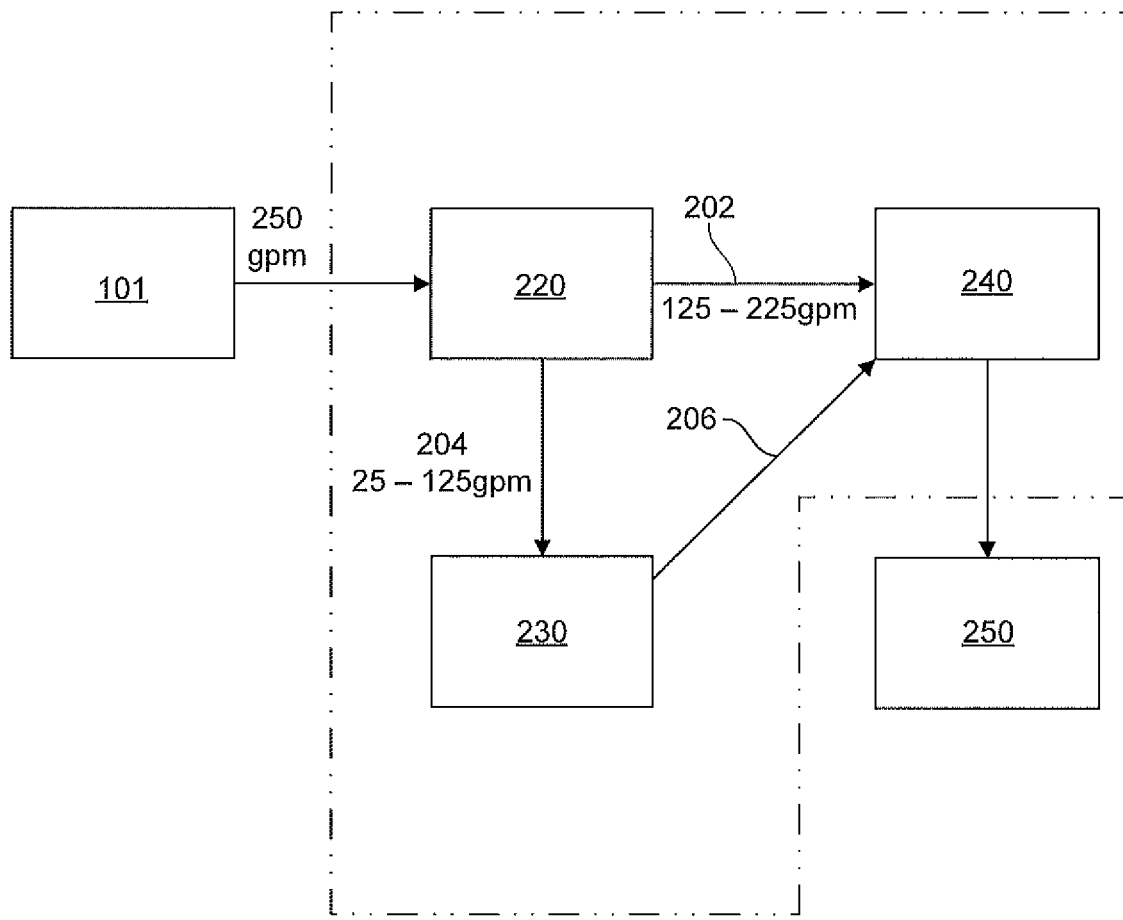
FIG. 7 is a block diagram of a system to remove contaminants from a contaminated water, according to one embodiment.

FIG. 7 is a block diagram of a system 110 to remove contaminants from a contaminated water, according to one embodiment. In the system shown in FIG. 7, a pre-concentrating subsystem 220 receives water from a contaminated water source 101 and produces a concentrated contaminated water 204 and a first product water 202. A contaminant removal subsystem 230 receives the concentrated contaminated water 204 and produces a second product water 206. A permeate blending subsystem 240 receives first product water 202 and second product water 206 and produces a blended product water 250. All of the first product water 202 and all of the second product water 206 may be mixed in the permeate blending subsystem 240 to produce a blended product water 250. As exemplary flowrates the contaminated water source 101 provides 250 gpm of contaminated water to the pre-concentrating subsystem 220. For example, the pre-concentrating subsystem produces 25 to 125 gpm of concentrated contaminated water and 125 to 225 gpm of first product water, thereby providing about 10% to about 50% of the volume of the contaminated water source 101 to the contaminant removal subsystem 230.

In the specific embodiment of FIG. 6, the contaminant removal subsystem processes 250 gpm of contaminated water. In the specific embodiment of FIG. 7, the contaminant removal subsystem processes the reduced rate of 25 to 125 gpm of concentrated contaminated water. Accordingly, the contaminant removal subsystem of FIG. 7 may have a reduced volume resulting in a significantly reduced cost and footprint, as compared to the contaminant removal subsystem exemplified in FIG. 6.

Figure 8:
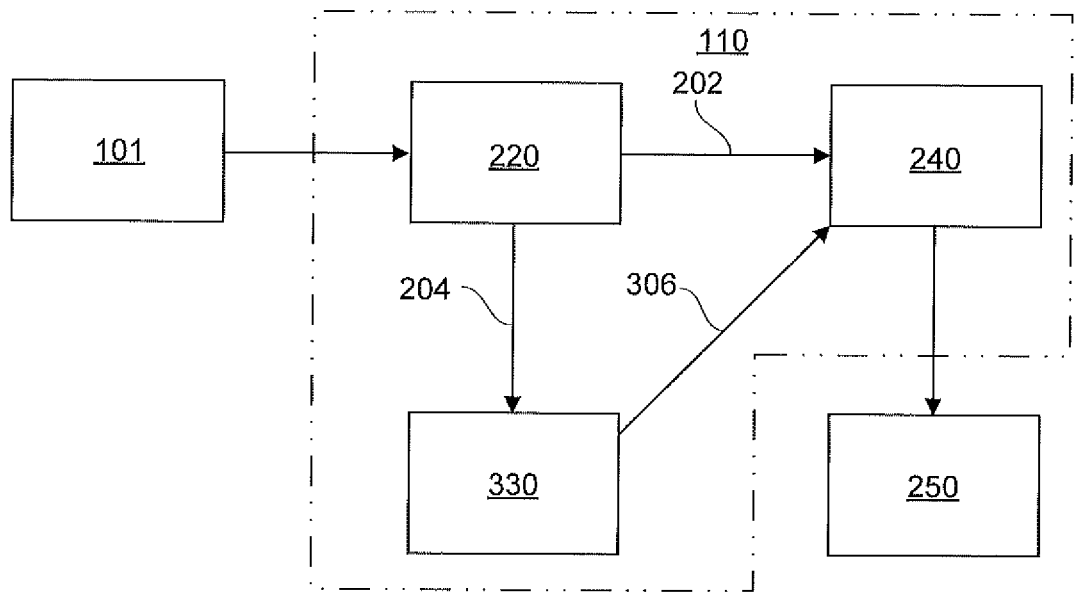
FIG. 8 is a block diagram of a system to remove contaminants from a contaminated water, according to an alternate embodiment.

FIG. 8 is a block diagram of a system 110 to remove contaminants from a contaminated water, according to an alternate embodiment. The system shown in FIG. 8 includes a biological subsystem 330 which receives concentrated contaminated water 204 from pre-concentrating subsystem 220 and produces second product water 306.

Figure 9:
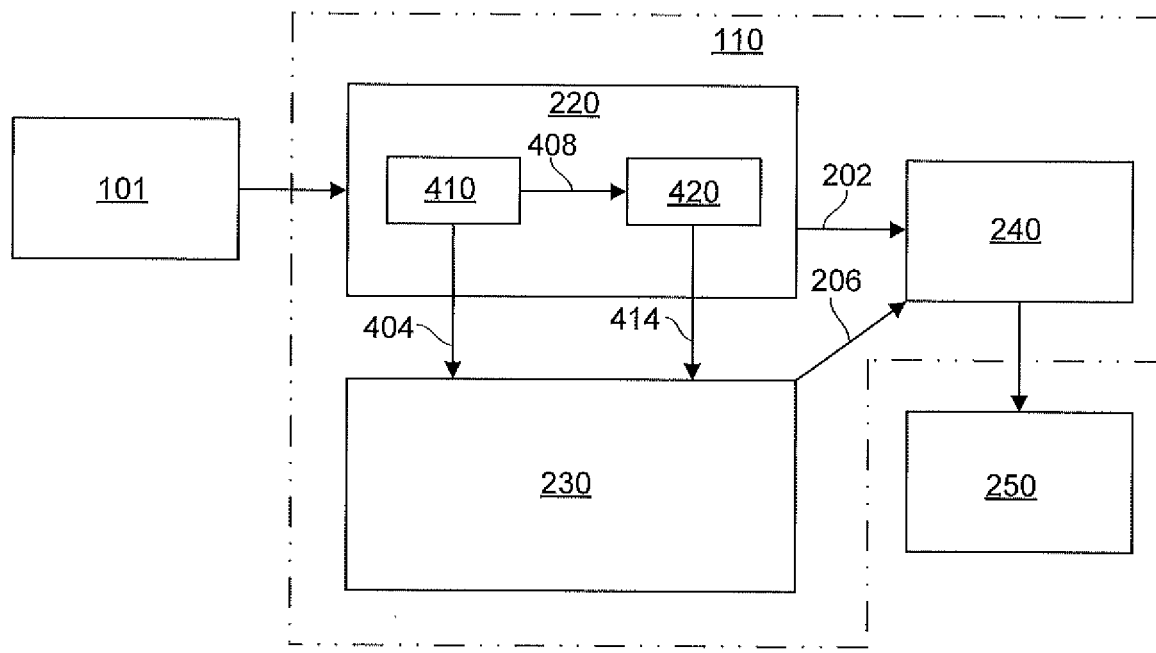
FIG. 9 is a block diagram of a system to remove contaminants from a contaminated water, according to yet another embodiment.

FIG. 9 is a block diagram of a system 110 to remove contaminants from a contaminated water according to yet another embodiment. The system shown in FIG. 9 includes a pre-concentrating subsystem 220 having a first pressure driven membrane system 410 and second pressure driven membrane system 420 in series. Concentrated contaminated water 404 produced from first pressure driven membrane system 410 is delivered to contaminant removal subsystem 230. Intermediate product water 408 from first pressure driven membrane system 410 is delivered as an influent to second pressure driven membrane system 420. Pressure driven membrane system 420 produces concentrated contaminated water 414 and first product water 202. Concentrated contaminated water 414 is also delivered to contaminant removal subsystem 230. Contaminant removal subsystem 230 produces a second product water 206, which is combined with first product water 202 in permeate blending subsystem 240.

EXAMPLES

Example 1

A test was conducted to determine the properties of a reverse osmosis process on a synthetic selenium containing feed. A single stage low pressure RO system consisting of three single module housing was evaluated with a feed solution of selenate (Se(VI)) in 1% Na2SO4 solution of pH 8-8.5, with 5 ppm of antiscalant (Flocon 135; Applied Membranes Vista Calif.)) was added to avoid membrane scaling. Feed pressure was 210-220 psig (1.45-1.51 MPa), permeate/concentrate ~0.8/~0.4 gpm (~3.03/~1.51 liter/min), recovery ~65-67%, selenium rejection 90-95%.

Two sequential tests were run with fresh feeds.

Figure 3:
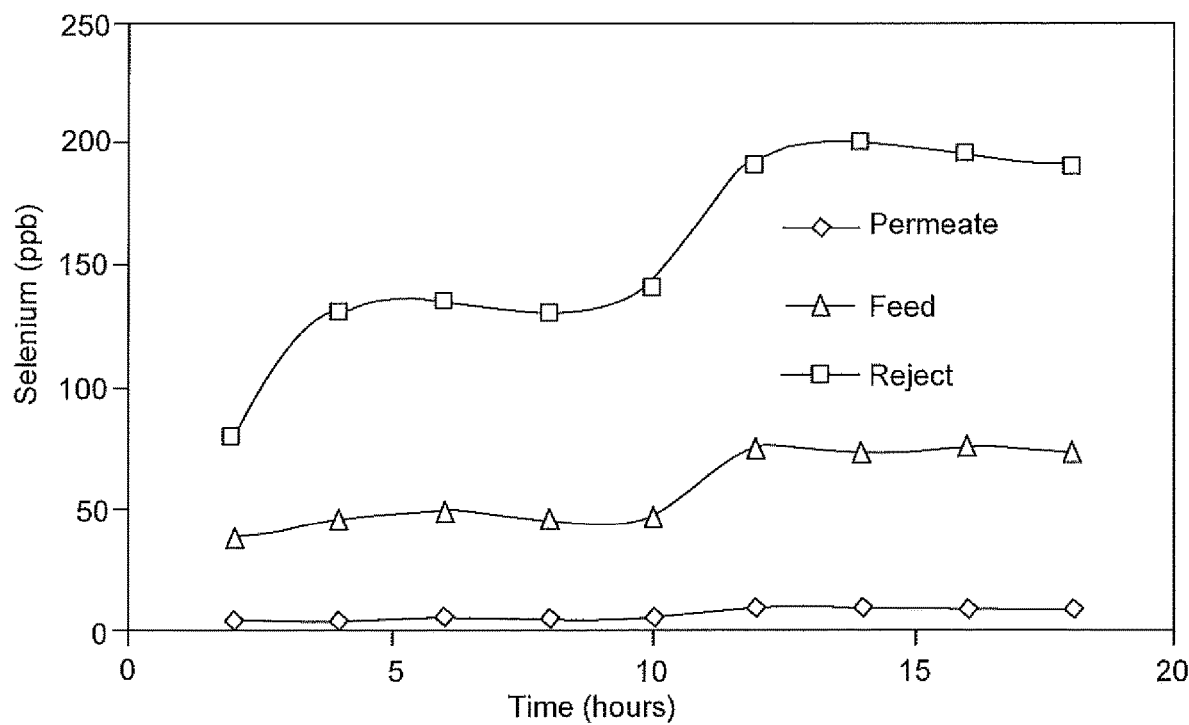
FIG. 3 shows results from a reverse osmosis trial with a selenium containing water source.

FIG. 3 shows the selenium content of the feed, concentrate, and permeate for this example. The second day run (starting at 10 hours) had a slightly high feed concentration which resulted in somewhat higher permeate content, and higher concentrate content.

For a feed of ~50 ppb, this rejection is satisfactory for attaining less than 5 ppb effluent.

For feed waters having higher selenium content, the user may use a permeate staged RO system to arrive at the desired permeate concentration

Example 2

Figure 4:
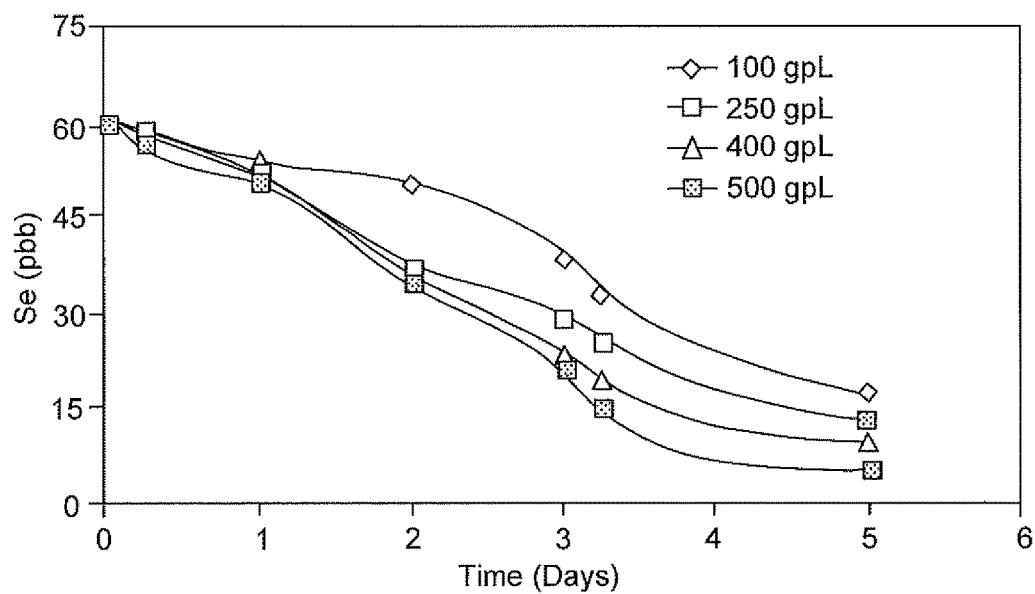
FIG. 4 shows the effect of several loadings of iron filings on selenium reduction.
Figure 5A:
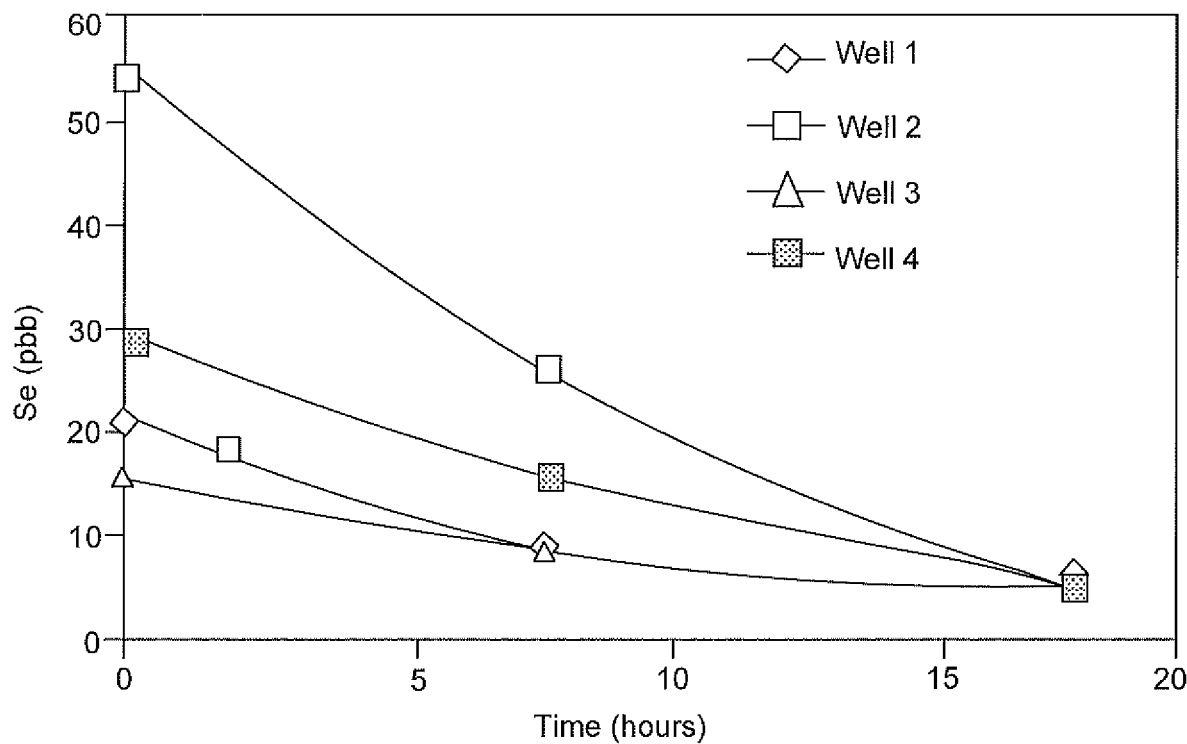
FIG. 5a shows the effect of using steel wool for selenium reduction in a waste water source.
Figure 5B:
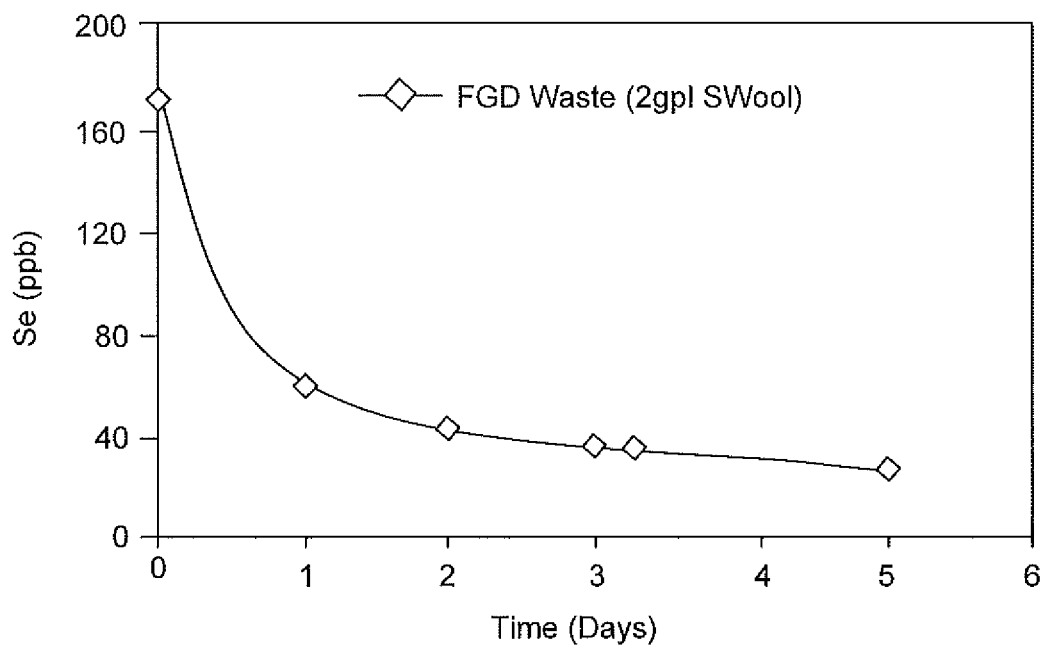
FIG. 5b shows the effect of using steel wool for selenium reduction in a waste water source.

FIG. 4 shows the results of a test to determine the effectiveness of using iron filings of approximately 2-5 mm size to remove selenium from water. Iron used for this purpose is sometimes called Zero Valent Iron, ZVI. Four 500 ml test solutions of 1% sodium sulfate solution containing 60 ppb of selenate (SeVI) were stirred with 100 g/L 9 gram per liter), 250 g/L, 400 g/L and 500 g/L iron filings respectively. FIG. 5b shows the decrease in dissolved selenium content over a period of days. Higher dosages show a lower selenate reduction, more so after day 3.

Example 3

Two industrial waste samples were tested for selenate removal using 2 grams per liter steel wool as the reducing agent. Steel wool is a bundle of strands of very fine soft steel filaments, made from low-carbon steel, used to polish wood or metal objects, and for cleaning household cookware. FIG. 5a shows that 4 samples of initial concentration from approximately 15 ppb to approximately 55 ppb were reduced to the 5 ppb in 5 hours. The results of FIG. 5b show a rapid drop in dissolved selenate level in the first day and then a slower reduction in selenate level over the next 4 days. The final concentration was about 37 ppb from an initial level of 170 ppb.

The results of the experiments shown in FIGS. 4, 5a, and 5b show that the type of water source being treated and iron type and size effect selenate reduction.

Example 4

To take advantage of the apparent high initial reaction rate of selenate removal by ZVI, a test was run using three sequential reactors. The reactors were 500 ml volume containing 20 grams of steel wool. Both PP and FGD waste were evaluated. Tests were run with 30 (Test 1) and 60 minutes (Test 2) agitation. The results in Table 3 show that the longer agitation time gave improved Se reduction.

TABLE 3

Selenium Removal by Three Sequential Reactors using 40 g/L Steel Wool as ZVI Source

| Test #1 | PP Stream 54 ppb Initial Se Content 30 minute residence per tank | FGD Waste Stream 160 ppb Initial Se Content 30 minute residence per tank |
|---|---|---|
| Cycle 1 Se content exit tank 1 | 41.8 | 118.9 |
| Cycle 1 Se content exit tank 2 | 31.6 | 89.1 |
| Cycle 1 Se content exit tank 3 | 13.8 | 56.6 |
| Cycle 2 Se content exit tank 1 | 32.3 | 118.9 |
| Cycle 2 Se content exit tank 2 | 24.9 | 76.4 |
| Cycle 2 Se content exit tank 3 | 15.4 | 46.7 |
| Cycle 3 Se content exit tank 1 | 29.9 | 76.4 |
| Cycle 3 Se content exit tank 2 | 22.1 | 52.3 |
| Cycle 3 Se content exit tank 3 | 15.0 | 49.5 |
| Average Effluent Se after 3 tank treatment | 15 ppb | 45 ppb |

| Test #2 | PP Waste Stream 32 ppb Initial Se Content 60 minute residence per tank | FGD Waste Stream 60 ppb Initial Se Content 60 minute residence per tank |
|---|---|---|
| Cycle 1 Se content exit tank 1 | 29.0 | 50.1 |
| Cycle 1 Se content exit tank 2 | 15.6 | 37.7 |
| Cycle 1 Se content exit tank 3 | 9.8 | 22.3 |
| Cycle 2 Se content exit tank 1 | 29.7 | 55.1 |
| Cycle 2 Se content exit tank 2 | 13.6 | 38.2 |
| Cycle 2 Se content exit tank 3 | 6.8 | 24.3 |
| Average Effluent Se after 3 tank treatment | 7 ppb | 27 ppb |

Example 5: Nano ZVI Slurry

A slurry was prepared from 20 grams of $FeSO_4 \cdot 7H_2O$, 40 ml water and 1 ml of $NaBH_4$.

The resultant black slurry of nanosized iron was used as a selenium reducing agent. Table 4 shows the result of a test where 500 ml samples of PP or FGD waste were treated for shaken for 14 hours with 2 or 5 ml of the slurry added. The data indicate effectiveness of this form of ZVI.

TABLE 4

| 500 ml Sample + ZVI slurry | Initial Se ppb | Se ppb after 3 hr | Se ppb after 14 hr |
|---|---|---|---|
| PP-ZVI 2 ml | 54 | 47 | 44 |
| PP-ZVI 5 ml | 54 | 30 | 28 |
| FGD-ZVI 2 ml | 170 | 94 | 92 |
| FGD-ZVI 5 ml | 170 | 83 | 81 |

Example 6: Fly Ash Pond

Wastewater originating from a fly ash pond was concentrated with a reverse osmosis (RO) membrane filter system.

The RO reject was treated with a Pironox® Advanced Reactive Media System, including zero valent iron (ZVI) media.

Approximately 80 gallons of wastewater were pre-concentrated with the RO system over a five hour period. The RO system was run at a 14 gallon per square foot per day (gfd) flux with a polyamide thin film composite membrane. The influent and effluent pressures remained at approximately 115 psi and 103 psi, respectively. Table 5 summarizes the RO system influent conditions and the RO permeate conditions at 75%, 82%, and 90% recovery.

TABLE 5

RO system influent conditions and permeate conditions

| Parameter | Units | RO Influent | Permeate 75% | 82% | 90% |
|---|---|---|---|---|---|
| pH | SU | — | 5.64 | — | — |
| TDS | mg/L | — | <10 | — | — |
| Conductivity | uS/cm | — | 7.7 | — | — |
| TOC | mg/L | — | 0.56 | — | — |
| Ammonia | mg/L N | — | 0.061 | 0.0666 | 0.116 |
| Nitrate | mg/L N | — | 0.02 | 0.03 | 0.03 |
| Aluminum, dissolved | ug/L | 18 | <0.13 | <0.13 | <0.13 |
| Arsenic, dissolved | ug/L | 2.2 | 0.042 | 0.057 | 0.11 |
| Iron, dissolved | ug/L | 110 | 1.8 | 2.1 | 2.6 |
| Selenium, dissolved | ug/L | 14 | 0.21 | 0.21 | 0.24 |

Table 6 is an expanded list of RO influent conditions and effluent (permeate) conditions at 75% recovery.

TABLE 6

RO influent conditions and permeate conditions at 75% recovery

| Parameter | Units | Influent | Effluent |
|---|---|---|---|
| pH | SU | 6.95 | 5.64 |
| Conductivity | uS/cm | 309 | 7.7 |
| TDS | mg/L | — | <10 |
| Turbidity | NTU | 0.15 | 0.14 |
| Bicarbonate | mg/L | 33.5 | <3.5 |
| $CO_2$ (free) | mg/L | 6.1 | <2.5 |
| Hardness, total ($CaCO_3$) | mg/L | 71.1 | 0.36 |
| Chloride | mg/L | 41.0 | 1.3 |
| Fluoride | mg/L | 0.29 | <0.001 |
| Ammonia | mg/L N | 0.04 | 0.061 |
| Nitrate | mg/L N | 0.22 | 0.02 |
| Phosphate | mg/L | <0.05 | <0.005 |
| Sulfate | mg/L | 53.0 | 0.34 |
| Silica | mg/L | 3.35 | 0.066 |
| TOC | mg/L | 2.4 | 0.56 |
| Aluminum | ug/L | 19 | <0.13 |
| Arsenic | ug/L | 0.9 | <0.042 |
| Barium | mg/L | <0.001 | <0.001 |
| Beryllium | mg/L | — | <0.002 |
| Boron | mg/L | — | 0.24 |
| Bromide | mg/L | 0.63 | 0.23 |
| Cadmium | mg/L | — | <0.002 |
| Calcium | mg/L | 22.0 | 0.11 |
| Chromium | mg/L | — | <0.002 |
| Cobalt | mg/L | — | <0.002 |
| Copper | mg/L | <0.002 | 0.002 |
| Iron | ug/L | 16 | 1.8 |
| Lead | mg/L | — | 0.02 |
| Magnesium | mg/L | 4.10 | 0.018 |
| Manganese | mg/L | 0.005 | <0.001 |
| Potassium | mg/L | 6.30 | <0.07 |

TABLE 6-continued

RO influent conditions and permeate conditions at 75% recovery

| Parameter | Units | Influent | Effluent |
|---|---|---|---|
| Selenium | ug/L | 16 | 0.21 |
| Sodium | mg/L | 25.0 | 0.95 |
| Strontium | mg/L | 0.03 | 0.001 |
| Zinc | mg/L | 0.007 | <0.002 |

The RO reject was treated with a Pironox® Advanced Reactive Media System. The ZVI system contained three continuously stirred tank reactors (R1, R2, and R3) arranged in series. R1 contained 200 g/L of ZVI media and each of R2 and R3 contained 100 g/L of ZVI media. About 80 mg/L of ferrous chloride ($FeCl_2$) was added to each reactor.

The system ran at a hydraulic retention time (HRT) of 12 hours, calculated from total reaction zone volume. Effluent samples were collected after 3 and 6 total volume turnovers. Table 7 summarizes the contaminant concentration in the effluent of each ZVI system reactor.

TABLE 7

Contaminant concentration in effluent from R1, R2, and R3

| Parameter | Units | Influent (RO reject) | After 3x Volumes R1 | R2 | R3 | After 6x Volumes R1 | R2 | R3 |
|---|---|---|---|---|---|---|---|---|
| Ammonia | mg/L N | 1.02 | 0.97 | 1.11 | 1.08 | 0.86 | 1.06 | 1.11 |
| Nitrate | mg/L N | 0.16 | 0.03 | 0.01 | 0.01 | 0.04 | 0.05 | 0.05 |
| Aluminum | ug/L | 7.0 | 2.6 | 1.9 | 3.0 | 3.8 | 1.8 | 1.8 |
| Arsenic | ug/L | 9.9 | 3.1 | 2.3 | 1.8 | 3.0 | 2.2 | 1.6 |
| Selenium | ug/L | 48 | 8.2 | 1.1 | 0.77 | 6.7 | 1.0 | 0.64 |

Table 8 lists the average effluent contaminant concentrations of the overall ZVI system, where influent is the RO reject, as compared to the effluent quality target concentration for each contaminant.

TABLE 8

ZVI system average effluent conditions

| Parameter | Units | Influent | Effluent Average | Target |
|---|---|---|---|---|
| Ammonia | mg/L N | 1.02 | 1.09 | — |
| Nitrate | mg/L N | 0.16 | 0.03 | <0.10 |
| Aluminum | ug/L | 7.0 | 2.4 | <70 |
| Arsenic | ug/L | 9.9 | 1.7 | <8.0 |
| Selenium | ug/L | 48 | 0.70 | <4.0 |

The contaminant concentrations were each higher in the ZVI system influent (RO effluent) than in the contaminated wastewater RO influent. Thus, each of the contaminants was concentrated by RO membrane filtration. For example, selenium in the RO influent was measured at 14-16 µg/L (ppb) and concentrated to 48 µg/L (ppb) by the RO system. The RO effluent water containing 48 µg/L (ppb) selenium was treated by the ZVI system to a final concentration of 0.7 µg/L (ppb) selenium. The selenium concentration target was 4.0 µg/L (ppb). All measured contaminant concentrations in the effluent of the ZVI system were below target concentrations.

Furthermore, the RO permeate water also contained contaminant concentrations below target concentrations. For example, the RO permeate water contains about 0.21-0.24 µg/L (ppb) selenium. Thus, a blended water having combined RO permeate water and ZVI system effluent may also contain contaminant concentrations below the target levels.

Accordingly, a process for removing contaminants from a contaminated water, including pre-concentrating contaminated water with a RO system and treating the concentrated contaminated water with a system containing ZVI media, can produce product water having a low concentration of contaminants within the environmental health and safety standards.

Those skilled in the art should appreciate that the parameters and configurations described herein are exemplary and that actual parameters and/or configurations will depend on the specific application in which the disclosed methods and materials are used. Those skilled in the art should also recognize or be able to ascertain, using no more than routine experimentation, equivalents to the specific embodiments disclosed. For example, those skilled in the art may recognize that the method, and components thereof, according to the present disclosure may further comprise a network or systems or be a component of a system to remove contaminants from a contaminated water. It is therefore to be understood that the embodiments described herein are presented by way of example only and that, within the scope of the appended claims and equivalents thereto; the disclosed embodiments may be practiced otherwise than as specifically described. The present systems and methods are directed to each individual feature, system, or method described herein. In addition, any combination of two or more such features, systems, or methods, if such features, systems, or methods are not mutually inconsistent, is included within the scope of the present disclosure. The steps of the methods disclosed herein may be performed in the order illustrated or in alternate orders and the methods may include additional or alternative acts or may be performed with one or more of the illustrated acts omitted.

Further, it is to be appreciated that various alterations, modifications, and improvements will readily occur to those skilled in the art. Such alterations, modifications, and improvements are intended to be part of this disclosure, and are intended to be within the spirit and scope of the disclosure. In other instances, an existing facility may be modified to utilize or incorporate any one or more aspects of the methods and systems described herein. Thus, in some instances, the systems may involve concentrating a volume of contaminated water from source of contaminated water. Accordingly the foregoing description and figures are by way of example only. Further the depictions in the figures do not limit the disclosures to the particularly illustrated representations.

While exemplary embodiments of the disclosure have been disclosed, many modifications, additions, and deletions may be made therein without departing from the spirit and scope of the disclosure and its equivalents, as set forth in the following claims.

What is claimed is:

1. A system to remove contaminants from a contaminated water, the system comprising:
   a pre-concentrating subsystem configured to receive a volume of the contaminated water and produce a concentrated contaminated water and a first product water, the contaminated water having a first concentration of contaminants, and the concentrated contaminated water having a second concentration of contaminants higher than the first concentration of contaminants;
   one of:
     a contaminant removal subsystem configured to receive the concentrated contaminated water and comprising zero valent iron media disposed in a reactor, the contaminant removal subsystem configured to remove contaminants selected from the group consisting of selenium-containing compounds, nitrate-containing compounds, arsenic-containing compounds, and mercury-containing compounds from the concentrated contaminated water, and configured to produce a second product water, or
     a biological subsystem configured to receive the concentrated contaminated water and configured to remove contaminants selected from the group consisting of selenium-containing compounds, nitrate-containing compounds, arsenic-containing compounds, and mercury-containing compounds from the concentrated contaminated water, and configured to produce second product water,
   the second product water having a third concentration of contaminants lower than the first concentration; and
   a permeate blending subsystem configured to receive and blend the first product water and at least a portion of the second product water.

2. The system of claim 1, wherein the pre-concentrating subsystem comprises two pressure driven membrane systems fluidly connected in series.

3. The system of claim 1, wherein the pre-concentrating subsystem comprises a filter system configured to remove macroparticles from the contaminated water.

4. The system of claim 1, wherein the system includes the contaminant removal subsystem and the contaminant removal subsystem comprises a clarifier fluidly connected downstream of the reactor.

5. The system of claim 1, wherein the system includes the contaminant removal subsystem and the zero valent iron media is disposed in one of a fluidized bed reactor, a packed bed reactor, or a mixed bed reactor in the contaminant removal subsystem.

6. The system of claim 1, wherein the permeate blending subsystem configured to receive and blend the first product water and all of the second product water.

7. A process for removing contaminants from a contaminated water, the process comprising:
   concentrating the contaminated water to produce a first product water having a lower concentration of contaminants than the contaminated water, and a concentrated contaminated water having a concentration of contaminants higher than the contaminated water;
   contacting the concentrated contaminated water with a zero valent iron media to produce a second product water having a concentration of contaminants lower than the concentrated contaminated water, the contaminants selected from the group consisting of selenium-containing compounds, nitrate-containing compounds, arsenic-containing compounds, and mercury-containing compounds;
   clarifying the second product water to produce a sludge comprising solid waste particles and a clarified liquid; and
   combining the first product water and at least a portion of the clarified liquid to produce a blended product water.

8. The process of claim 7, further comprising thickening the sludge and dewatering the sludge to produce a dewatered sludge and a dewatering liquid.

9. The process of claim 7, wherein concentrating the contaminated water comprises treating the contaminated water with a pressure driven membrane system.

10. The process of claim 9, wherein concentrating the contaminated water comprises treating the contaminated water with at least two pressure driven membrane systems.

11. The process of claim 7, wherein concentrating the contaminated water comprises concentrating a volume of contaminated water and producing a first product water having about 50% to about 90% of the volume of the contaminated water and a concentrated contaminated water having about 10% to about 50% of the volume of the contaminated water.

12. The process of claim 7, further comprising pre-filtering the contaminated water with a filter system to remove macroparticles, prior to concentrating the contaminated water.

13. The process of claim 7, further comprising combining the first product water and all of the clarified liquid to produce the blended product water.

14. A process for removing contaminants from a contaminated water, the process comprising:
concentrating the contaminated water to produce a first product water having a lower concentration of contaminants than the contaminated water, and a concentrated contaminated water having a concentration of contaminants higher than the contaminated water;
contacting the concentrated contaminated water with a biological subsystem to produce a second product water having a concentration of contaminants lower than the concentrated contaminated water, the contaminants selected from the group consisting of selenium-containing compounds, nitrate-containing compounds, arsenic-containing compounds, and mercury-containing compounds;
clarifying the second product water to produce a sludge comprising solid waste particles and a clarified liquid; and
combining the first product water and at least a portion of the clarified liquid to produce a blended product water.

15. The process of claim 14, further comprising combining the first product water and all of the clarified liquid to produce the blended product water.

16. A method of facilitating removal of contaminants from a contaminated water, the method comprising:
providing a pre-concentrating subsystem fluidly connectable to a source of contaminated water, configured to concentrate a volume and concentration of contaminants of the contaminated water and configured to produce a concentrated contaminated water having between about 10% and about 50% of the volume and at least a majority of the contaminants of the contaminated water and a first product water having between about 50% and about 90% of the volume and at most a minority of the contaminants of the contaminated water;
providing one of:
a contaminant removal subsystem comprises zero valent iron media disposed in a reactor, the contaminant removal subsystem configured to remove contaminants selected from the group consisting of selenium-containing compounds, nitrate-containing compounds, arsenic-containing compounds, and mercury-containing compounds from the concentrated contaminated water, and configured to produce a second product water, or
a biological subsystem configured to remove contaminants selected from the group consisting of selenium-containing compounds, nitrate-containing compounds, arsenic-containing compounds, and mercury-containing compounds from the concentrated contaminated water, and configured to produce second product water; and
providing a permeate blending subsystem configured to receive and blend the first product water and at least a portion of the second product water.

17. The method of claim 16, wherein providing the permeate blending system comprises providing a permeate blending subsystem configured to receive and blend the first product water and all of the second product water.

* * * * *